United States Patent
Soeno et al.

(10) Patent No.: US 7,474,506 B2
(45) Date of Patent: *Jan. 6, 2009

(54) MAGNETIC RECORDING MEDIUM, RECORDING/REPRODUCING APPARATUS, AND STAMPER

(75) Inventors: Yoshikazu Soeno, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 11/265,260

(22) Filed: Nov. 3, 2005

(65) Prior Publication Data

US 2006/0193083 A1  Aug. 31, 2006

(30) Foreign Application Priority Data

Feb. 28, 2005  (JP)  ................................ 2005-053100

(51) Int. Cl.
G11B 5/82 (2006.01)
(52) U.S. Cl. ........................ 360/135; 360/48; 360/77.08
(58) Field of Classification Search ................. 360/135, 360/48, 77.05, 77.08, 78.08, 78.14
See application file for complete search history.

(56) References Cited

U.S. PATENT DOCUMENTS

| | | | |
|---|---|---|---|
| 5,907,448 A | 5/1999 | Watanabe et al. | |
| 6,014,296 A | 1/2000 | Ichihara et al. | |
| 6,144,517 A | 11/2000 | Watanabe et al. | |
| 2001/0036030 A1* | 11/2001 | Sacks et al. | 360/75 |
| 2003/0123170 A1* | 7/2003 | Miyata et al. | 360/17 |
| 2005/0254160 A1* | 11/2005 | Bandic et al. | 360/77.08 |
| 2006/0203386 A1* | 9/2006 | Soeno et al. | 360/135 |

FOREIGN PATENT DOCUMENTS

| | | |
|---|---|---|
| JP | 6-195907 | 7/1994 |
| JP | 6-259709 | 9/1994 |
| JP | 9-097419 | 4/1997 |
| JP | 2002-015418 | 1/2002 |

OTHER PUBLICATIONS

English Language Abstract of JP 9-097419.
English Language Abstract of JP 6-195907.
English Language Abstracct of JP 6-259709.
English Language Abstract of JP 2002-015418.

(Continued)

*Primary Examiner*—William J Klimowicz
(74) *Attorney, Agent, or Firm*—Greenblum & Bernstein, P.L.C.

(57) ABSTRACT

In a magnetic recording medium including a servo pattern region having a servo pattern formed of a concave/convex pattern having convex portions and concave portions and a data recording region, the region having a data track pattern, the concave portions are formed in an address pattern region of the servo pattern region such that the maximum lengths, which are located in the respective same radius regions of the respective lengths along the rotating direction of a substrate of the projecting end surfaces of the convex portions constituting the concave/convex pattern are set to first lengths that are double the minimum lengths along the rotating direction of the projecting end surfaces of the convex portions in the respective same radius regions. With this arrangement, the magnetic recording medium can securely read a magnetic signal and has a servo pattern having excellent surface smoothness.

10 Claims, 15 Drawing Sheets

OTHER PUBLICATIONS

U.S. Appl. No. 11/214,813 to Soeno et al., filed Aug. 31, 2005.
U.S. Appl. No. 11/214,827 to Soeno et al., filed Aug. 31, 2005.
U.S. Appl. No. 11/229,650 to Soeno et al., filed Sep. 20, 2005.
U.S. Appl. No. 11/265,152 to Soeno et al., filed Nov. 3, 2005.

* cited by examiner

F I G . 1 3
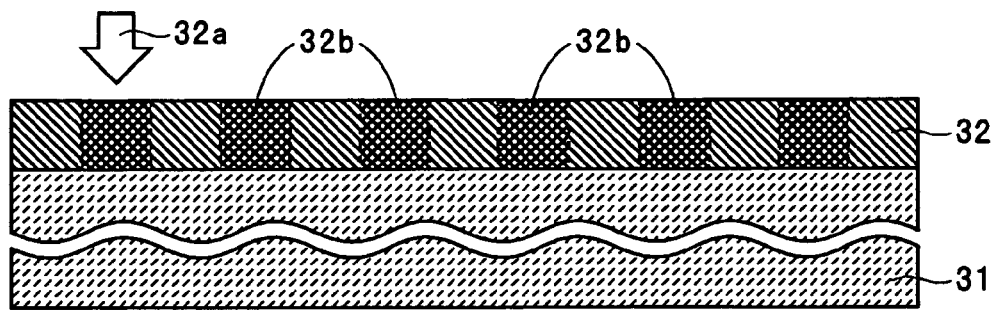
F I G . 1 4
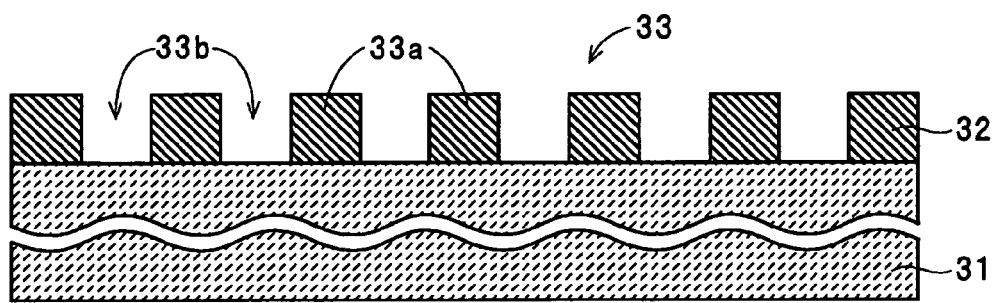
F I G . 1 5
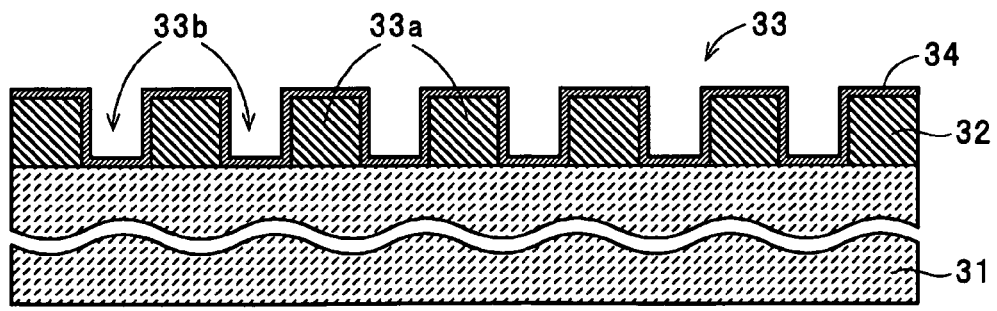

FIG. 29
PRIOR ART
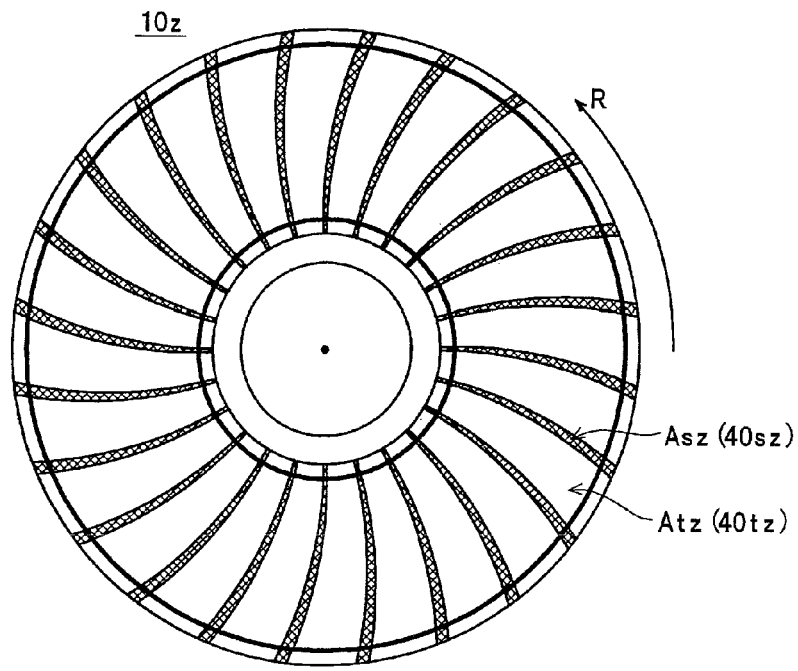
*F I G. 3 0* PRIOR ART
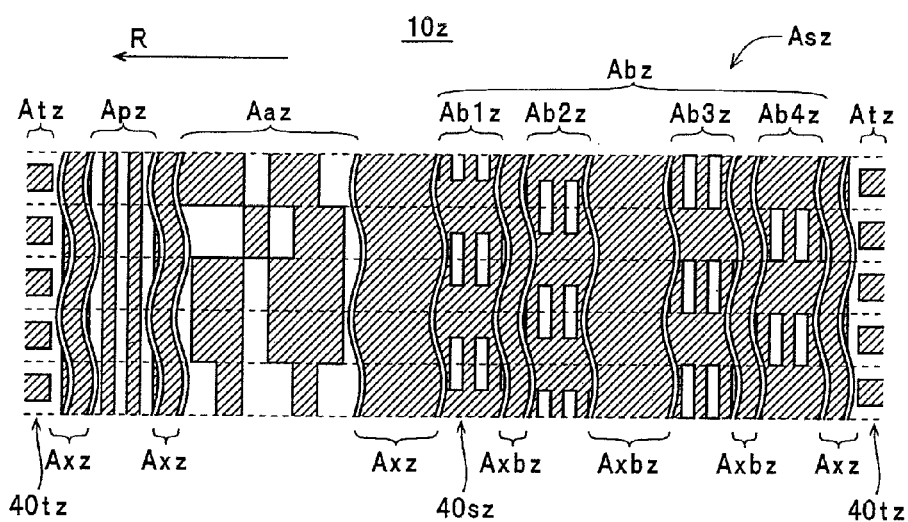

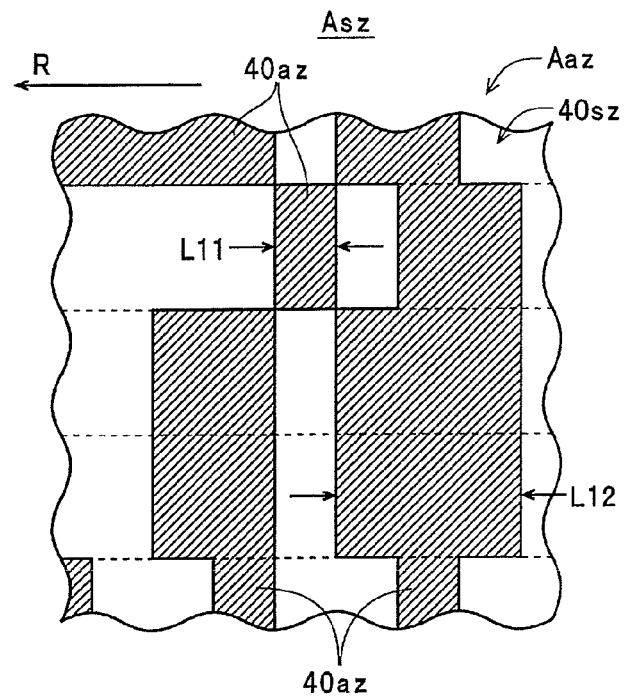
FIG. 31
PRIOR ART
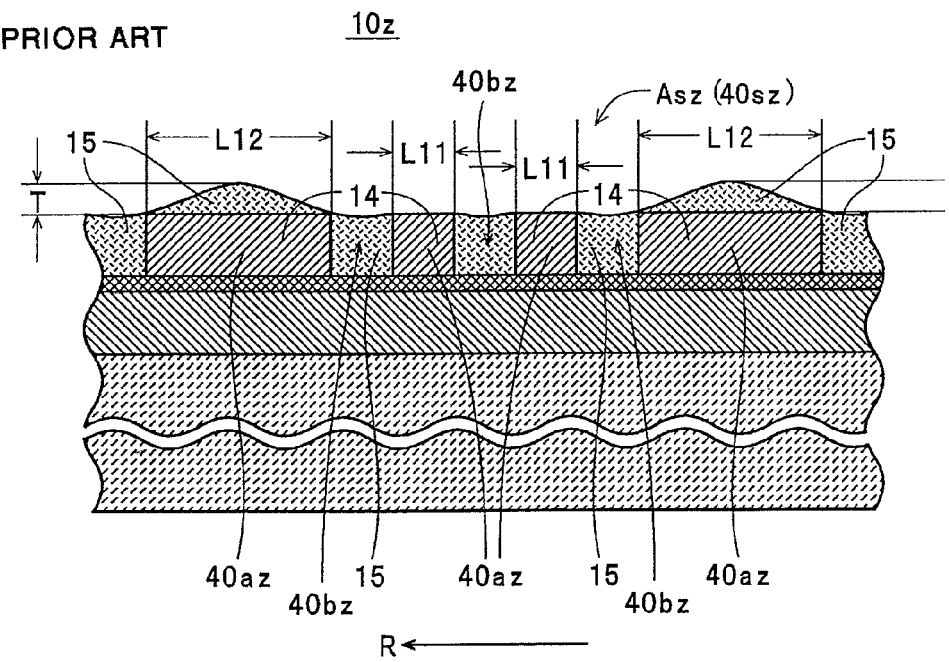

MAGNETIC RECORDING MEDIUM, RECORDING/REPRODUCING APPARATUS, AND STAMPER

BACKGROUND OF THE INVENTION

1. Field of the Invention

The present invention relates to a magnetic recording medium having a servo pattern formed of a concave/convex pattern in a servo patterns region, to a recording/reproducing apparatus having the magnetic recording medium, and to a stamper for manufacturing the magnetic recording medium.

2. Description of the Related Art

Japanese Laid-Open Patent Publication No. H09-97419 discloses a magnetic recording apparatus, which is composed of a discrete track type magnetic disk, as a recording/reproducing apparatus provided with this type of the magnetic recording medium. In this case, the magnetic disk mounted on the magnetic recording apparatus is arranged such that concentric recording tracks (band-shaped convex portions) composed of a magnetic recording member (magnetic material) is formed on one surface side of a glass disk substrate (base member) so that the magnetic disk can record and reproduce various types of data. Further, a guard band member (non-magnetic material) is filled in the concave portions between the recording tracks and forms guard band portions to improve the surface smoothness of the magnetic disk as well as to magnetically separate adjacent magnetic tracks from each other.

When the magnetic disk is manufactured, first, a magnetic recording layer is formed by sputtering a magnetic material on one surface side of a base member. Next, after a positive-type resist is spin coated and prebaked so as to cover the magnetic recording layer, a pattern similar to the pattern of the guard band portions is drawn using a mastering apparatus and subjected to development processing. With this operation, a resist pattern (concave/convex pattern) is formed on the magnetic recording layer. Subsequently, after the magnetic recording layer is etched using the resist pattern as a mask, a residual mask on the magnetic recording layer is removed by an ashing apparatus. With this operation, recording tracks composed of the magnetic material and a servo pattern (concave/convex pattern) is formed on the base member. Next, a non-magnetic material is sputtered to the base member in this state. At the time, the non-magnetic material is sputtered to a sufficient thickness until the concave portions constituting the servo pattern and the concave portions between the recording tracks are entirely filled with the non-magnetic material as well as the convex portions constituting the servo pattern and the recording tracks are covered with the non-magnetic material. Subsequently, the surface of the sputtered non-magnetic material is dry etched, thereby the projecting end surfaces of the convex portions constituting the servo pattern, the recording tracks, and the like (surfaces of the magnetic material) are exposed from the non-magnetic material. With this operation, the magnetic disk is completed.

SUMMARY OF THE INVENTION

The inventors have found the following problems as a result of examination of the above magnetic disk. That is, in the magnetic disk, after the non-magnetic material is sputtered so as to cover the entire area of the base member, the surface of the magnetic disk is flattened by dry etching the non-magnetic material until the projecting end surfaces (upper surfaces) of the convex portions constituting the servo patterns, the recording tracks, and the like are exposed. When, however, the magnetic disk is manufactured by the above manufacturing method, a large amount of the non-magnetic material remains on the convex portions having wide projecting end surfaces (convex portions having long lengths in arbitrary directions on the projecting end surfaces, hereinafter, the convex portions are also called "convex portions which are long in all the directions", and hereinafter the non-magnetic material remaining on the convex portions is also called "residual"). Accordingly, the convex portions may be covered with a thick residual.

Specifically, as shown in, for example, FIG. 29, in a magnetic disk 10z manufactured by the above manufacturing method, data recording regions Atz and servo pattern regions Asz are disposed alternately in the rotating direction of the magnetic disk 10z (in the direction of an arrow R shown in FIG. 29), a data track pattern 40tz formed of a plurality of concentric data recording tracks are formed in each of the data recording regions Atz, and a tracking servo pattern 40sz is formed in each of servo pattern regions Asz. Further, as shown in FIG. 30, the servo pattern regions Asz of the magnetic disk 10z includes, as an example, preamble pattern regions Apz having a preamble pattern formed therein, address pattern regions Aaz having an address pattern formed therein, and burst pattern regions Abz including burst regions Ab1z to Ab4z each having a burst pattern formed therein. It should be noted that, in the figure and in FIG. 31 that will be referred to later, the regions with slanting lines show the regions in which convex portions are formed in the servo pattern 40sz and the data track pattern 40tz (convex portions 40az in FIG. 32).

In this case, in conventional magnetic disks including the magnetic disk 10z, the lengths of the convex portions 40az of the servo pattern 40sz formed in the address pattern regions Aaz (refer to FIG. 32) may be made very long along the rotating direction of the base member in correspondence to the contents of address data to be recorded. Specifically, when address data is recorded to the address pattern regions Aaz as binary data, if, for example, convex portions 40az are formed in correspondence to "1" and concave portions 40bz are formed in correspondence to "0" (refer to FIG. 32), the lengths of the convex portions 40az along the rotating direction are made long in the portion in which a large number of "1"s continuously exist on the address data. As a result, as shown in, for example, FIG. 31, in the portion of the address data in which "1"s do not exist continuously (portion in which the address data is composed of "0, 1, 0"), the lengths L11 along the rotating direction of the convex portions 40az, which are formed in correspondence to "1"s, are made relatively short. In contrast, in the portion of the address data in which a plurality of "1"s exist continuously (for example, a portion in which the address data is composed of "0, 1, 1, 1, 0", and the like), the lengths L12 along the rotating direction of the convex portions 40az, which are formed in correspondence to "1"s, are made long. In this case, as shown in FIGS. 30 and 31, in the address pattern regions Aaz, since the convex portions 40az are continuously formed in a radius direction so as to cross a plurality of recording tracks (in the up/down direction in both the figures) in many cases, the lengths of convex portions 40az tend to be made long along a radius direction. Accordingly, in the portion of the address data in which a plurality of "1"s exist continuously, the lengths of the projecting end surfaces of the convex portions 40az are made long along both the radius direction and the rotating direction (projecting end surfaces are made excessively wide).

Further, as shown in FIG. 30, in the conventional magnetic disk 10z, non-servo signal regions Axz each composed of convex portions composed of a magnetic material (magnetic layers 14: refer to FIG. 32) are formed in the respective regions between the data recording regions Atz and the preamble pattern regions Apz, between the preamble pattern regions Apz and the address pattern regions Aaz, between the address pattern regions Aaz and the burst pattern regions Abz, and the burst pattern regions Abz and the data recording regions Atz. Further, non-servo signal regions Axbz composed of convex portions composed of a magnetic material (magnetic layers 14) are formed between the respective regions from the burst regions Ab1z to the burst regions Ab4z in the burst pattern regions Abz. No tracking servo control signal is recorded in the non-servo signal regions Axz, Axbz and almost all the areas of the non-servo signal regions Axz, Axbz are composed of convex portions and no concave portion exists therein.

In this case, the applicant has found a phenomenon that when the respective convex portions 40az are exposed by dry etching the layer of a non-magnetic material 15 formed so as to cover the servo pattern 40sz and the like (layer of a material for forming the guard band portions between the convex portions 40az and the like: refer to FIG. 32), the wider are projecting end surfaces of the convex portions 40az located under the layer (the longer are the convex portions 40az in all the directions: for example, the longer are the projecting end surfaces of the convex portions 40az along both the rotating direction and the radius direction), the slower the etching proceeds to the non-magnetic material 15. Accordingly, when the layer of the non-magnetic material 15 is dry etched, a thick residual is formed in the portions in which the convex portions 40az whose lengths along the rotating direction are long in the address pattern regions Aaz are formed (as an example, the convex portions 40az having the lengths L12).

Specifically, as shown in FIG. 32, on, for example, the convex portions 40az whose projecting end surfaces have the lengths L11 that are short along the rotating direction (an example of the convex portions 40az whose lengths are short along any of the directions), the non-magnetic material 15 is sufficiently etched by the dry etching, thereby the projecting end surfaces of the convex portions 40az are exposed from the non-magnetic material 15. In contrast, the etching to the non-magnetic material 15 proceeds slowly on the convex portions 40az whose projecting end surfaces have the lengths L12 that are long along the rotating direction thereof and are wide (an example of the convex portions 40az which are long in all the directions). Accordingly, when the dry etching is stopped at the time the projecting end surfaces of the convex portions 40az having the short lengths L11 are exposed from the non-magnetic material 15, a residual having a thickness T is formed (the convex portions 40az are covered with the non-magnetic material 15). As a result, the surface smoothness of the address pattern regions Aaz is deteriorated in the portions in which the residual is formed (portions in which a large number of "1"s continuously exist in the address data). Further, a thick residual is also formed in the non-servo signal regions Axz, Axbz and the like in which the convex portions 40az having the wide projecting end surfaces are formed likewise the portions on the convex portions 40az having the lengths L12 are formed. As a result, the surface smoothness of the servo pattern regions Asz is deteriorated in the portions in which the residual is formed (non-servo signal regions Axz, Axbz and the like).

In contrast, when the dry etching is continued until the residual on the convex portions 40az whose projecting end surfaces are extremely wide are completely eliminated, not only the non-magnetic material 15 but also even the magnetic layer 14 (convex portions 40az) are etched in the portions of the convex portions 40az whose projecting end surfaces have the short lengths L11 along the rotating direction thereof.

Accordingly, when the dry etching is continued until the residual on the convex portions 40az are completely removed over the entire area of the address pattern regions Aaz, the convex portions 40az are excessively etched in the portions in which the lengths of the projecting end surfaces are relatively short along the rotating direction, the radius direction, and the like (for example, in the portions in which "1"s do not continuously exist in the address data). Accordingly, it may be difficult to securely read magnetic signals (address data). Further, when the dry etching is continued until the residual on the convex portions 40az are completely eliminated over the entire area of the servo pattern regions Asz including the non-servo signal regions Axz and Axbz, the convex portions 40az are excessively etched in a portion whose length is short in any of the directions (for example, in the preamble pattern regions Apz). Accordingly, it may be difficult to securely read the magnetic signals from the portion (region).

A main object of the present invention, which was made in view of the above problems, is to provide a magnetic recording medium, which can securely read a magnetic signal and moreover has a servo pattern having excellent surface smoothness, a recording/reproducing apparatus, and a stamper which can manufacture the magnetic recording medium.

To achieve the above object, a magnetic recording medium according to the present invention includes a servo pattern region formed on at least one surface side of a substrate, the servo pattern region having a servo pattern formed of a concave/convex pattern having a plurality of convex portions and concave portions, at least projecting end portions of the convex portions are formed of a magnetic material and a data recording region formed on the one surface side of the substrate, the data recording region having a data track pattern on which a concentric or spiral data recording track is formed, wherein the concave portions are formed in an address pattern region of the servo pattern region such that the maximum lengths, which are located in the respective same radius regions each having the same distance from the center of the data track pattern, of the respective lengths along the rotating direction of the substrate of projecting end surfaces of the respective convex portions constituting the concave/convex pattern are set to first lengths that are double the minimum lengths along the rotating direction of the projecting end surfaces of the respective convex portions in the respective same radius regions. It should be noted that the term the "double lengths" used in the present specification means that the lengths, which include a very slight degree of a manufacturing error or a slight difference initially set different from the manufacturing error in the double lengths of the minimum lengths are included in the category of the double lengths. Accordingly, even if lengths different from predetermined lengths set as target lengths are obtained in a manufacturing process due to a manufacturing error and the like, it is assumed that the lengths are equal to the predetermined lengths as long as the lengths are within a predetermined range set above and below the predetermined lengths.

In the magnetic recording medium, the concave portions are formed in the address pattern region such that the maximum lengths, which are located in the respective same radius regions, of the respective lengths along the rotating direction of the projecting end surfaces of the convex portions constituting the concave/convex pattern are set to first lengths that are double the minimum lengths along the rotating direction of the projecting end surfaces of the convex portions in the respective same radius regions. As a result, there are no convex portions whose lengths along the rotating direction of the projecting end surfaces are excessively long (convex portions which are long in all the directions) in the address pattern region in which the lengths of the projecting end surfaces of the convex portions in a radius direction tend to increase. Accordingly, when the layer of a non-magnetic material formed so as to cover the concave/convex pattern in the servo pattern region is etched, a thick residual can be prevented from being formed on the convex portions in the address pattern region, unlike in the conventional magnetic disk. With this arrangement, there can be provided a magnetic recording medium, which has excellent flatness in the address pattern region and moreover can securely read the address data, and a recording/reproducing apparatus including the magnetic recording medium. Further, the difference between the maximum lengths and the minimum lengths along the rotating direction of the convex portions in the address pattern region is small. Accordingly, even if the projecting end surfaces of the convex portions having the maximum lengths are sufficiently etched until they are exposed from the non-magnetic material, the convex portions having the minimum lengths can be prevented from being excessively etched. With this arrangement, there can be provided a magnetic recording medium, which can accurately read the address data, and a recording/reproducing apparatus including the magnetic recording medium.

In this case, the concave portions constituting the concave/convex pattern may be formed in the servo pattern region such that when a circular region whose diameter is equal to the maximum length of the respective first lengths is disposed in any portions of the servo pattern region, at least a part of the concave portions is included in the circular region. It should be noted that the state that "at least a part of the concave portions is included in the circular region" disclosed in the present specification means the state that the "boundary portions between the convex portions and the concave portions constituting the concave/convex pattern (the ends of the concave portions) are included in the circular region". With this arrangement, there are no convex portions whose projecting end surfaces are excessively long (the projecting end surfaces are excessively long) in all the areas of not only the address pattern region but also the servo pattern region. Accordingly, when the layer of the non-magnetic material formed so as to cover the concave/convex pattern of the servo pattern region is etched, a thick residual can be prevented from being formed in the entire area of the servo pattern region including the non-servo signal regions and the like, unlike in the conventional magnetic disk. With this arrangement, there can be provided a magnetic recording medium, which has excellent flatness in the servo pattern region and moreover can securely read data for controlling tracking servo, and a recording/reproducing apparatus including the magnetic recording medium.

The plurality of data recording tracks may be formed of convex portions, at least the projecting end portions of which are formed of the magnetic material, and the respective data recording tracks may be formed such that the lengths thereof along a radius direction of the substrate are equal to or less than the maximum length of the respective first lengths. With this arrangement, there are no convex portions whose projecting end surfaces are excessively long along a radius direction (convex portions which are long in all the directions) in the data recording region in which the lengths along the rotating direction of the projecting end surfaces of the convex portions are made long. As a result, when the layer of the non-magnetic material formed so as to cover the concave/convex pattern of the data recording region is etched, a thick residual can be prevented from being formed on the convex portions (data recording tracks). Accordingly, there can be provided a magnetic recording medium, which has excellent flatness in both of the servo pattern region and the data recording region (entire area of the magnetic recording medium) and moreover can stably record and reproduce data, and a recording/reproducing apparatus including the magnetic recording medium.

Further, a magnetic recording medium according to the present invention includes a servo pattern region formed on at least one surface side of a substrate, the servo pattern region having a servo pattern formed of a concave/convex pattern having a plurality of convex portions and concave portions, at least the projecting end portions of the convex portions are formed of a magnetic material, and a data recording region formed on the one surface side of the substrate, the data recording region having a data track pattern on which a concentric or spiral data recording track is formed, wherein the concave portions are formed in an address pattern region of the servo pattern region such that the respective lengths along the rotating direction of the substrate of the projecting end surfaces of the respective concave portions constituting the concave/convex pattern are set to second lengths that are equal to each other in the respective same radius regions each having the same distance from the center of the data track pattern. It should be noted that, in the present specification, the terms "the lengths that are equal to each other" mean that the lengths, which include a very slight degree of a manufacturing error or a slight difference initially set different from the manufacturing error are included in the category of the equal lengths. Accordingly, even if lengths different from predetermined lengths set as target lengths are obtained in a manufacturing process due to a manufacturing error and the like, it is assumed that the lengths are equal to the predetermined lengths as long as the lengths are within a predetermined range set above and below the predetermined lengths.

In the magnetic recording medium, the concave portions are formed in the address pattern region such that the respective lengths along the rotating direction of the projecting end surfaces of the convex portions have the second lengths that are equal to each other in the respective same radius regions. Thus, there are no convex portions whose projecting end surfaces are excessively long along the rotating direction (convex portions which are long in all the directions) in the address pattern region in which the lengths along a radius direction of the projecting end surfaces of the convex portions tend to increase. Accordingly, when the layer of the non-magnetic material formed so as to cover the concave/convex pattern of the servo pattern regions is etched, a thick residual can be prevented from being formed on the convex portions in the address pattern region, unlike in the conventional magnetic disk $10z$. With this arrangement, there can be provided a magnetic recording medium, which has excellent flatness in the address pattern region and moreover can securely read the address data, and a recording/reproducing apparatus including the magnetic recording medium. Further, the maximum lengths along the rotating directions of the convex portions in the address pattern region are composed of only the one type of the second lengths which are equal to each other in the respective same radii. Accordingly, even if the projecting end surface of any of the convex portions in the address pattern region is sufficiently etched until it is exposed from the non-magnetic material, the other convex portions can be prevented from being excessively etched. With this arrangement, there can be provided a magnetic recording medium, which can accurately read the address data, and a recording/reproducing apparatus including the magnetic recording medium.

In this case, the concave portions constituting the concave/convex pattern may be formed in the servo pattern region such that when a circular region whose diameter is equal to the maximum length of the respective second lengths is disposed in any portions in the servo pattern region, at least a part of the concave portions is included in the circular region. With this arrangement, there are no convex portions whose projecting end surfaces are excessively long (the projecting end surfaces are excessively wide) in the entire area of not only the address pattern region but also the servo pattern region. Accordingly, when the layer of the non-magnetic material formed so as to cover the concave/convex pattern in the servo pattern region is etched, a thick residual can be prevented from being formed on the convex portions in the entire area of the servo pattern region including the non-servo signal regions, unlike in the conventional magnetic disk 10z. With this arrangement, there can be provided a magnetic recording medium, which has excellent flatness in the address pattern region and moreover can securely read data for controlling tracking servo, and a recording/reproducing apparatus including the magnetic recording medium.

The plurality of data recording tracks may be formed of convex portions at least the projecting end portions of which are formed of the magnetic material, and the respective data recording tracks may be formed such that the lengths thereof along a radius direction of the substrate are equal to or less than the maximum length of the respective second lengths. With this arrangement, there are no convex portions whose projecting end surfaces are excessively long along a radius direction (convex portions which are long in all the directions) in data recording region in which the lengths along the rotating direction of the projecting end surfaces of the convex portions are made long. As a result, when the layer of the non-magnetic material formed so as to cover the concave/convex pattern of the data recording region is etched, a thick residual can be prevented from being formed on the convex portions (data recording tracks). Accordingly, there can be provided a magnetic recording medium, which has excellent flatness in both of the servo pattern region and the data recording region (entire area of the magnetic recording medium) and moreover can stably record and reproduce data, and a recording/reproducing apparatus including the magnetic recording medium.

A recording/reproducing apparatus according to the present invention includes any of the magnetic recording mediums and a control section for executing tracking servo control processing based on a predetermined signal read from the servo pattern region of the magnetic recording medium.

The recording/reproducing apparatus includes any of the magnetic recording mediums and the control section for executing the tracking servo control processing based on the predetermined signal read from the servo pattern region of the magnetic recording medium. Accordingly, data can be recorded and reproduced through a magnetic head placed on convex portions (data recording track) in a data recording region without being affected by the existence of the concave/convex pattern (dummy pattern) formed in, for example, the non-servo signal regions.

Further, a stamper according to the present invention is a stamper for manufacturing a magnetic recording medium and includes a concave/convex pattern formed thereon, the concave/convex pattern having convex portions formed in correspondence to the concave portions of the concave/convex pattern in any of the magnetic recording mediums and concave portions formed in correspondence to the convex portions of the concave/convex pattern in any of the magnetic recording mediums.

Formed on the stamper are the concave/convex pattern which has the convex portions formed in correspondence to the concave portions and the concave portions formed in correspondence to the convex portions of the concave/convex pattern in any of the magnetic recording mediums. As a result, when an intermediate body for manufacturing the magnetic recording medium is subjected to imprint processing, a concave/convex pattern, in which no convex portions whose projecting end surfaces are wide exist in the address pattern region and the like, can be formed on the layer of a magnetic material. Therefore, convex portions, which have wide projecting end surfaces in the address pattern region and the like, can be prevented from being formed by etching the layer of the magnetic material in the intermediate body using the concave/convex pattern or a concave/convex pattern (mask) whose concave and convex positional relation is in coincidence with the concave/convex pattern. As a result, when the layer of the non-magnetic material formed so as to cover the concave/convex pattern is etched, a thick residual can be prevented from being formed on the convex portions of the address pattern region and the like. With this arrangement, a magnetic recording medium, which has excellent flatness and moreover can securely read the address data and the like, can be manufactured. Further, since no excessively wide concave portions exist in the stamper in correspondence to the projecting end surfaces of the convex portions of the magnetic recording medium, when the concave/convex pattern of the stamper is pressed against a resin layer of the intermediate body (resin mask forming layer), the insufficient height of the convex portions due to the insufficient amount of movement of the resin material (resin layer) into the concave portions of the stamper can be prevented (insufficient thickness of the resin mask). Accordingly, when, for example, other mask layer is etched using the concave/convex pattern formed to the resin layer as a mask, the convex portions of the resin layer can be prevented from disappearing prior to the completion of etching of the mask layer. As a result, a concave/convex pattern having sufficiently deep concave portions can be formed on the layer of the magnetic material. With this arrangement, when the layer of the magnetic material is etched using the concave/convex pattern as a mask, the concave/convex pattern having the sufficiently deep concave portions can be formed on the layer of the magnetic material.

It should be noted that disclosure of the present invention relates to the subject contained in Japanese Patent Application No. 2005-53100 filed on Feb. 28, 2005, which is hereby explicitly incorporated as reference.

BRIEF DESCRIPTION OF THE DRAWINGS

These and other objects and features of the present invention will be explained in more detail below with reference to the attached drawings, wherein:

FIG. 13 is a cross-sectional view of a state in which a latent image is formed by irradiating an electronic beam onto the resist layer;

FIG. 14 is a cross-sectional view of a state in which a concave/convex pattern is formed by subjecting the resist layer on which the latent image is formed to development processing;

FIG. 15 is a cross-sectional view of a state in which a nickel layer is formed so as to cover the concave/convex pattern formed by the development processing;

FIG. 29 is a plan view of a conventional magnetic disk;

FIG. 30 is a plan view of the conventional magnetic disk showing an example of various types of patterns formed in a data recording region and a servo pattern region;

FIG. 31 is a plan view of the conventional magnetic disk showing an example of an address pattern formed in an address pattern region; and FIG. 32 is a cross-sectional view showing a layer structure of the conventional magnetic disk.

DESCRIPTION OF THE PREFERRED EMBODIMENTS

A best mode of a magnetic recording medium, a recording/reproducing apparatus, and a stamper according to the present invention will be explained below with reference to the accompanying drawings.

Figure 1:
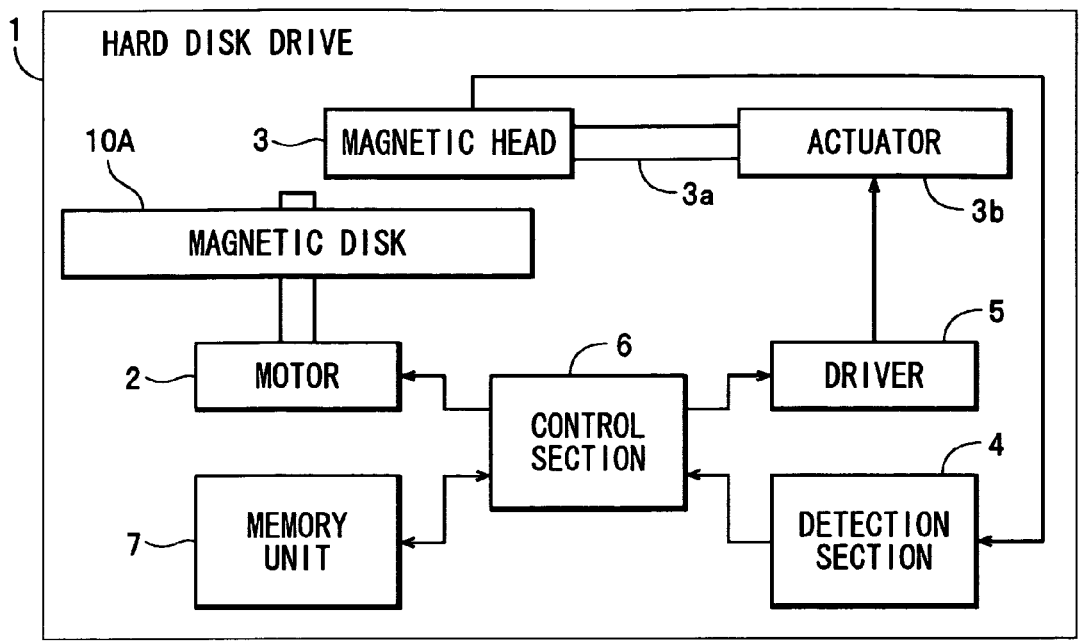
FIG. 1 is a constitutional view of a hard disk drive.

A hard disk drive 1 shown in FIG. 1 is an example of the recording/reproducing apparatus which includes a motor 2, a magnetic head 3, a detection section 4, a driver 5, a control section 6, a memory unit 7, and a magnetic disk 10A and can record and reproduce various types of data. The motor 2 rotates the magnetic disk 10A at, for example, a constant speed of 4200 rpm under the control of the control section 6. The magnetic head 3 is attached to an actuator 3b through a swing arm 3a and moved on the magnetic disk 10A by the actuator 3b when data is recorded to and reproduced from the magnetic disk 10A. Further, the magnetic head 3 reads out servo data from servo pattern regions Asa (refer to FIG. 2) of the magnetic disk 10A, magnetically writes recording data to data recording regions At (refer to FIG. 2), and reads out recording data magnetically written to the data recording regions At. It should be noted that although the magnetic head 3 is actually formed on the bottom surface (air bearing surface) of a slider for flying the magnetic head 3 with respect to the magnetic disk 10A, the explanation and the illustration of the slider are omitted. The actuator 3b moves the magnetic head 3 to an arbitrary recording/reproducing position on the magnetic disk 10A by swinging the swing arm 3a by a drive current supplied from the driver 5 under the control of the control section 6.

The detection section 4 obtains (detects) servo data from an output signal (analog signal) output from the magnetic head 3 and outputs it to the control section 6. The driver 5 places the magnetic head 3 on a desired data recording track by controlling the actuator 3b according to a control signal output from the control section 6. The control section 6 integrally controls the hard disk drive 1. Further, the control section 6 is an example of a control section according to the present invention and controls the driver 5 based on servo data (an example of "a predetermined signal read from the servo pattern regions) output from the detection section 4 (executes tracking servo control processing). The memory unit 7 stores the operation program and the like of the control section 6.

Figure 4:
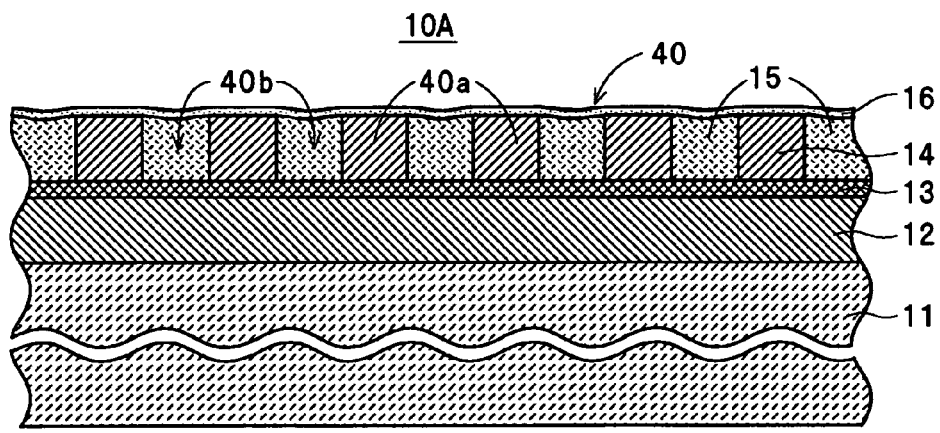
FIG. 4 is a cross-sectional view showing a layer structure of the magnetic disk.

In contrast, the magnetic disk 10A is an example of a magnetic recording medium according to the present invention and disposed in a cabinet of the hard disk drive 1 together with the motor 2, the magnetic head 3, and the like described above. The magnetic disk 10A is a discrete track type magnetic disk (patterned medium) that can record recording data by a perpendicular recording system and composed of a soft magnetic layer 12, an intermediate layer 13, and magnetic layers 14 formed on a glass substrate 11 in this order as shown in FIG. 4. In this case, the magnetic layers 14 constitute a concave/convex pattern 40 in which convex portions 40a and concave portions 40b, which are interposed between the convex portions 40a, are formed, and the convex portions 40a are formed of a magnetic material in its entirety from the projecting ends (upper ends in FIG. 4) to base ends (lower ends in FIG. 4). Further, a non-magnetic material 15 such as $SiO_2$ or the like is filled in the concave portions 40b, thereby the surface of the magnetic disk 10A is flattened. Further, a protection layer 16 (DLC film) having a thickness of about 2 nm is formed with diamond-like carbon (DLC) and the like on the surface of the non-magnetic material 15 filled in the concave portions 40b and on the magnetic layers 14 (convex portions 40a). Further, a lubricant (as an example, fomblin lubricant) is coated on the surface of the protection layer 16 to avoid the damage to both the magnetic head 3 and the magnetic disk 10A.

The glass substrate 11 corresponds to a base member in the present invention and is formed to a circular disk shape having a thickness of about 0.6 mm by polishing the front surface of a glass sheet. It should be noted that the base member in the present invention is not limited to the glass substrate, and base members that are composed of various types of non-magnetic materials such as aluminum, ceramics, and the like, and formed in a circular shape may be used. The soft magnetic layer 12 is formed in a thin film shape having a thickness of about 100 nm to 200 nm by sputtering a soft magnetic material such as CoZrNb alloy and the like. The intermediate layer 13 is a layer acting as a base layer for forming the magnetic layers 14 and formed in a thin film shape having a thickness of about 40 nm by sputtering an intermediate layer forming material such as Cr, CoCr non-magnetic alloy, and the like. The magnetic layers 14 are layers for constituting a concave/convex pattern 40 (a data track pattern 40t and a servo pattern 40sa shown in FIG. 3), and concave portions 40b are formed by etching a layer formed by sputtering, for example, CoCrPt alloy as described later.

Figure 2:
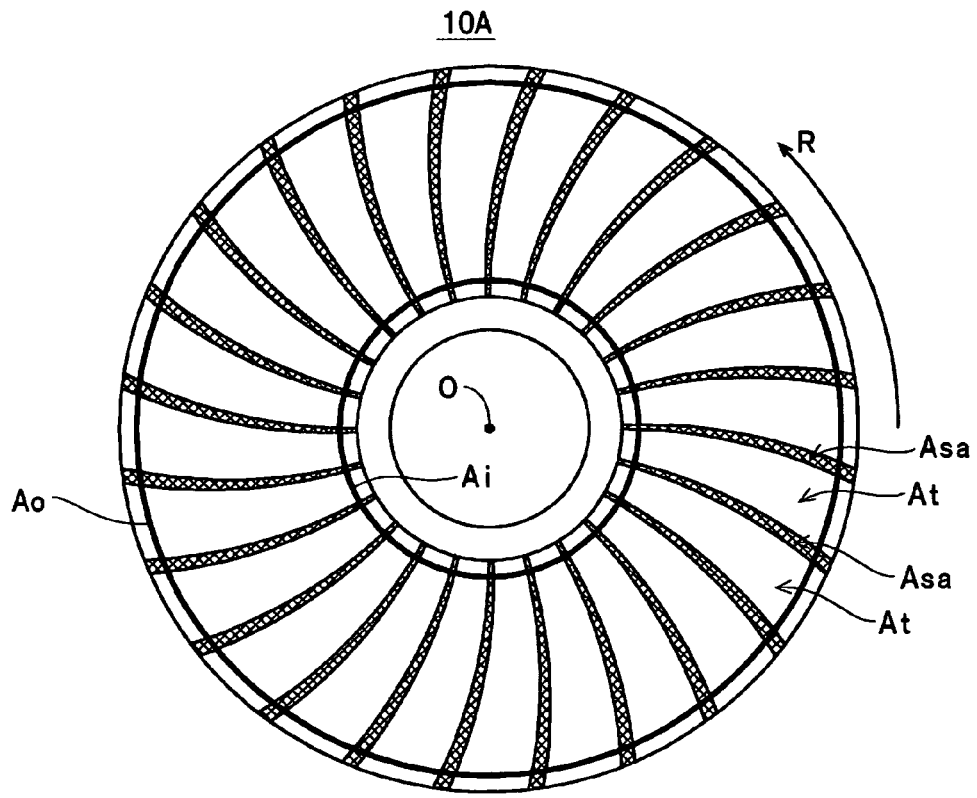
FIG. 2 is a plan view of a magnetic disk.

In this case, as shown in FIG. 2, in the magnetic disk 10A, servo pattern regions Asa are interposed between the data recording regions At such that the data recording regions At and the servo pattern regions Asa are alternately arranged in the rotating direction of the magnetic disk 10A (in the direction of an arrow R). It should be noted that, in this specification, the region, which is sandwiched between two data recording regions (in the example, data recording regions At) arranged side by side in the rotating direction (the region from the end of one data recording region on a rotating direction side to the end of other one data recording region on the rotating direction side) is arranged as the servo pattern regions (in the example, the servo pattern regions Asa). Further, it is assumed that the ends of the data recording regions on the rotating direction side are in coincidence with a virtual line (linear or arc line segments along the radius direction of the magnetic disk) connecting the respective ends of the plurality of data recording tracks (the convex portions 40a to be described later) formed in the data recording regions on the rotating direction side thereof.

Further, in the hard disk drive 1 on which the magnetic disk 10A is mounted, the motor 2 rotates the magnetic disk 10A at a constant angular speed under the control of the control section 6, as described above. Accordingly, in the magnetic disk 10A, the length of the data recording regions At along the rotating direction of the magnetic disk 10A and the length of the servo pattern regions Asa along the rotating direction are made longer in proportion to the length on the magnetic disk 10A passing under the magnetic head 3 per unit time as these regions are more separated from the center O of the data track pattern 40t (so that the data recording regions At and the servo pattern regions Asa are made wider in an outer peripheral region Ao than in an inner peripheral region Ai). As a result, the lengths along the rotating direction of the projecting end surfaces of the data recording tracks (convex portions 40a) formed in the data recording regions At, the reference lengths along the rotating direction of the projecting end surfaces of the respective convex portions 40a for the servo pattern 40sa formed in the servo pattern regions Asa, and the reference opening lengths along the rotating direction of the respective concave portions 40b for the servo pattern 40sa (the length between the confronting ends of both the projecting end surfaces of adjacent convex portions 40a) (for example, a length corresponding to a unit signal length) are made longer in the outer peripheral region Ao than in the inner peripheral region Ai. It should be noted that, in the following description, the opening length of the concave portion is also called "a length of the concave portion".

In this case, the reference lengths along the rotating direction of the projecting end surfaces of the respective convex portions 40a in the servo pattern regions Asa are set to approximately the respective same lengths within the range of several tens of tracks which are disposed adjacent to each other in the radius direction of the magnetic disk 10A. Therefore, in the present specification, the description will be made assuming that the reference lengths along the rotating direction are equal to each other in the range of the several tens of tracks. Specifically, it is assumed, for example, that, in the range of several tens of tracks included in the inner peripheral region Ai, the reference lengths along the rotating direction are equal to each other and that, in the range of several tens of tracks included in the outer peripheral region Ao, the reference lengths along the rotating direction are equal to each other. Further, the lengths along the rotating direction of the projecting end surfaces of the convex portions 40a formed in the respective servo pattern regions Asa will be explained using corresponding lengths at the respective same radius positions (regions having the same radii) that have the same distances from the center O of the data track pattern 40t as a reference as long as there is no particular restriction.

Figure 3:
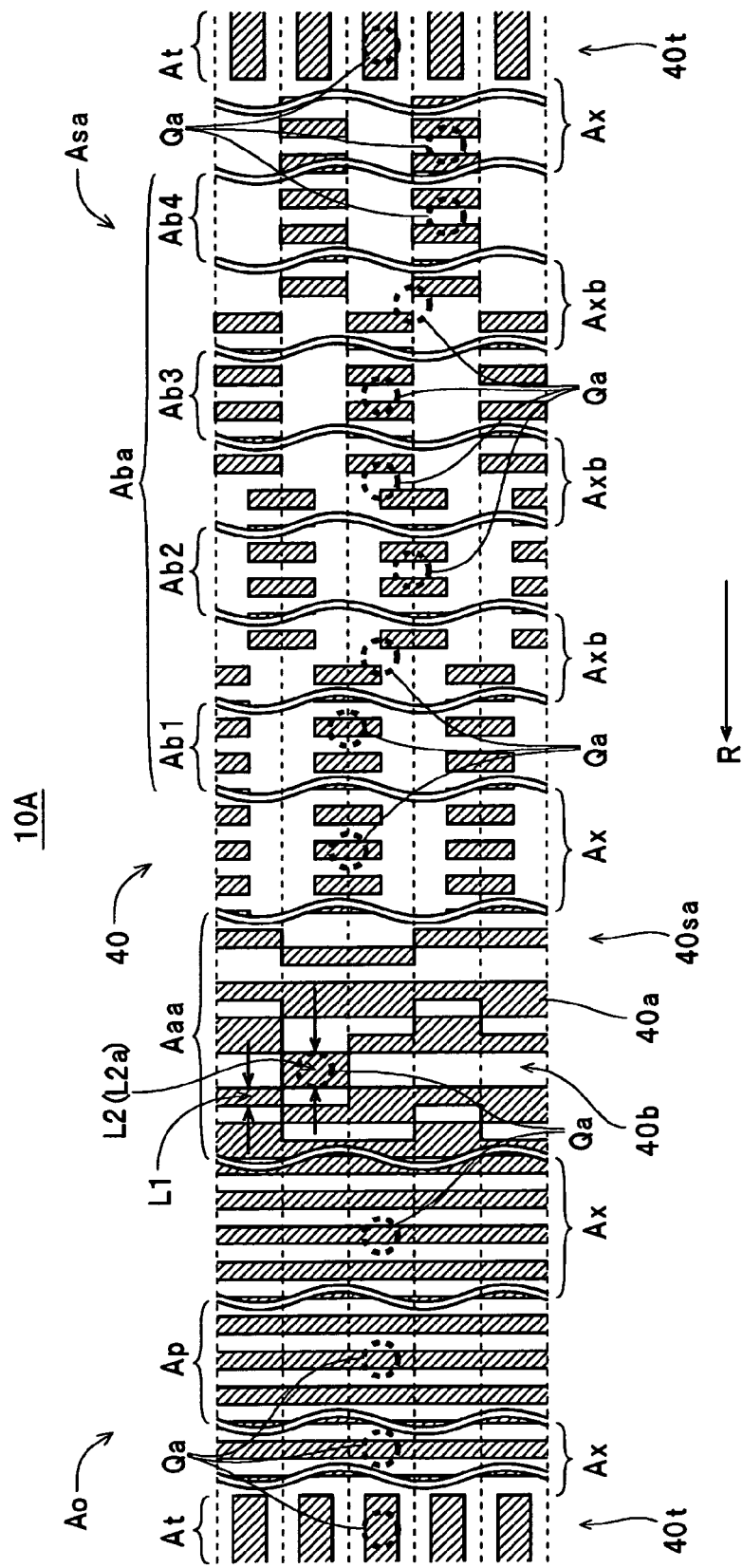
FIG. 3 is a plan view of a magnetic disk showing an example of various types of patterns formed in a data recording region and a servo pattern region in an outer peripheral region.
Figure 5:
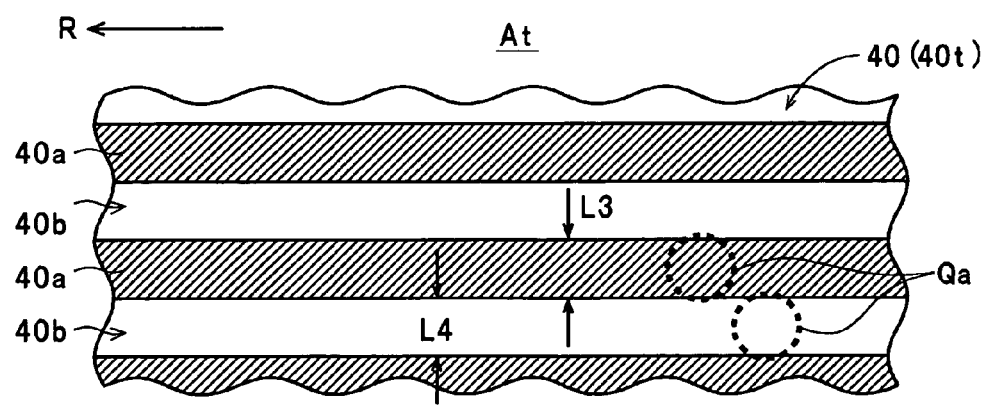
FIG. 5 is a plan view of the magnetic disk showing an example of a data track pattern formed in the data recording region.

Further, as shown in FIG. 3, a data track pattern 40t is formed in the data recording regions At. It should be noted that slanted regions in FIG. 3, and in FIGS. 5 to 9 and 24 to 26 to be referred to later show the regions in which the convex portions 40a are formed in the concave/convex pattern 40. In this case, as shown in FIG. 5, the data track pattern 40t is composed of a large number of the convex portions 40a (data recording tracks) formed in a concentric (or spiral) shape around the center O (refer to FIG. 2) and the concave portions 40b (inter-track concave portions: guard band portions in the conventional magnetic disk) between the respective convex portions 40a. It should be noted that although it is preferable that the center of rotation of the magnetic disk 10A is in coincidence with the center O of the data track pattern 40t, there may be caused a minute dislocation of about 30 to 50 μm therebetween due to a manufacturing error and the like. However, since a tracking servo control can be sufficiently executed to the magnetic head 3 even if the dislocation exists in the amount described above, it can be said that the center of rotation is substantially in coincidence with the center O.

Further, as shown in FIG. 5, in the data recording regions At of the magnetic disk 10A, the lengths L3 of the projecting end surfaces of the convex portions 40a (data recording tracks) along the radius direction and the lengths L4 of the concave portion 40b (guard band portion) along the radius direction have the respective same lengths (ratio of length: 1:1) as an example. Further, in the magnetic disk 10A, the lengths L3 of the convex portions 40a formed in the data recording regions At and the lengths L4 of the concave portion 40b along the radius direction formed thereto are set to the respective same lengths from the inner peripheral region Ai to the outer peripheral region Ao of the magnetic disk 10A. In this case, the lengths L3 of the convex portions 40a along the radius direction are set equal to or smaller than the respective maximum lengths (lengths L2a to be described later: refer to FIG. 7) of the respective lengths along the rotating direction of the projecting end surfaces of the convex portions 40a formed in the servo pattern regions Asa (address pattern regions Aaa). Further, the non-magnetic material 15 is filled in the concave portions 40b of the data track pattern 40t, thereby the data recording regions At is flattened.

In contrast, as shown in FIG. 3, the servo pattern 40sa including a preamble pattern formed in preamble pattern regions Ap, an address pattern formed in the address pattern regions Aaa, a burst pattern formed in burst pattern regions Aba, and a dummy pattern formed in non-servo signal regions Ax are formed in the servo pattern regions Asa. In this case, a part formed in the preamble pattern regions Ap, the address pattern regions Aaa, and the burst pattern regions Aba, all of which are in the servo patterns 40sa, is equivalent to a pattern corresponding to "a predetermined signal" (control signal for tracking servo control) in the present invention. Further, in the servo pattern 40sa, the positions at which the convex portions 40a and the concave portions 40b are formed and the sizes thereof (lengths and the like thereof along the rotating direction) are set corresponding to "a predetermined signal" in the present invention.

Figure 6:
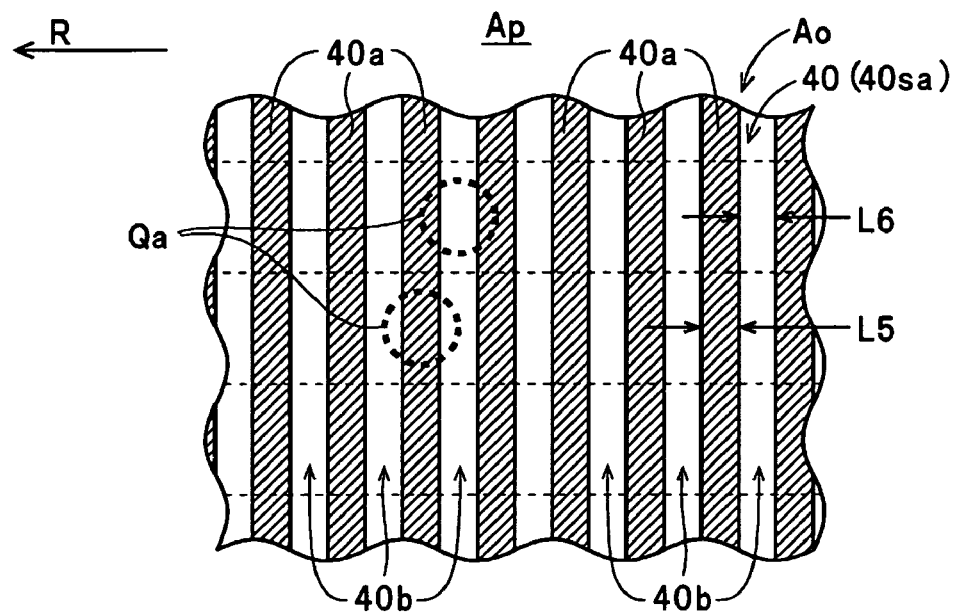
FIG. 6 is a plan view of the magnetic disk showing an example of a preamble pattern formed in a preamble pattern region in the outer peripheral region.

Specifically, the preamble pattern formed in the preamble pattern regions Ap is a servo pattern for correcting a reference clock for reading various control signals from the address pattern regions Aaa and the like according to the rotating state (rotating speed) of the magnetic disk 10A. As shown in FIG. 6, the strip-shaped convex portions 40a that are long in the radius direction (up/down direction in the figure) of the magnetic disk 10A are formed along the rotating direction (the direction of the arrow R) of the magnetic disk 10A across the concave portions 40b. In this case, the lengths L5 of the projecting end surfaces along the rotating direction of the convex portions 40a formed in the preamble pattern regions Ap and the lengths L6 of the concave portions 40b along the rotating direction are set such that they have the respective same lengths at the respective same radius positions having the same distances from the center O and are longer in the outer peripheral region Ao than in the inner peripheral region Ai. Further, the lengths L5 along the rotating direction of the projecting end surfaces of the convex portions 40a formed in the preamble pattern regions Ap are set, for example, such that they are equal to the respective minimum lengths (the lengths L1 to be described later: refer to FIG. 7) of the respective lengths along the rotating direction of the convex portions 40a formed in the address pattern regions Aaa at the respective same radius positions. It should be noted that the lengths L5 and L6 along the rotating direction of the convex portions 40a and the concave portions 40b of the preamble pattern are not limited to the above examples, and the lengths L5 of the convex portions 40a and the lengths L6 of the concave portions 40b may be set to lengths that are different from each other.

Figure 7:
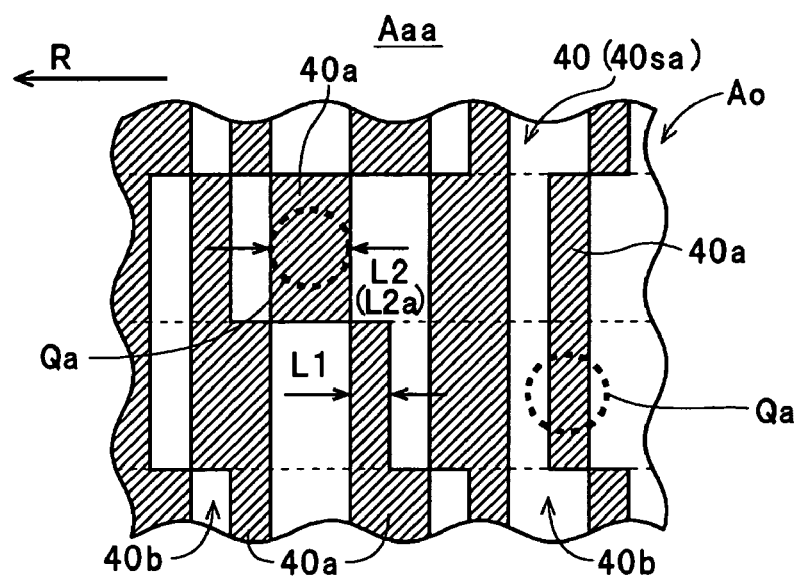
FIG. 7 is a plan view of the magnetic disk showing an example of an address pattern formed in an address pattern region in the outer peripheral region.

Further, the address pattern formed in the address pattern regions Aaa is a servo pattern formed in correspondence to the address data showing the track number and the like of a track on which the magnetic head 3 is placed on a track. As shown in FIG. 7, the respective lengths along the rotating direction of the projecting end surfaces of the convex portions 40a and the respective lengths along the rotating direction of the concave portions 40b are set in correspondence to the address data described above. In this case, in the magnetic disk 10A, the address data is encoded according to Manchester code, Biphase-M code, and the like and recorded in the address pattern regions Aaa. Specifically, since the convex portions 40a are formed in correspondence to a high level of Manchester code and the concave portions 40b are formed in correspondence to a low level thereof, the concave/convex pattern 40 that corresponds to the data contents of the address data is formed in the address pattern regions Aaa.

In the magnetic disk 10A, the minimum lengths L1 at the respective same radius positions of the respective lengths along the rotating direction of the projecting end surfaces of the convex portions 40a formed in the address pattern regions Aaa are set, for example, equal to the respective lengths L5 along the rotating direction of the projecting end surfaces of the convex portions 40a formed in the preamble pattern regions Ap at the respective same radius positions. Further, the maximum lengths L2 (an example of "the first lengths" in the present invention) at the respective same radius positions of the respective lengths along the rotating direction of the projecting end surfaces of the convex portions 40a formed in the address pattern regions Aaa are set, for example, such that they are twice the respective lengths L1 at the respective same radius positions. In this case, in the magnetic disk 10A, the reference lengths along the rotating direction are made longer in the outer peripheral region Ao than in the inner peripheral region Ai, as described above. Accordingly, in the magnetic disk 10A, the maximum lengths L2 of the respective lengths along the rotating direction of the projecting end surfaces in the convex portions 40a in the address pattern regions Aaa in the outer peripheral region Ao (hereinafter, when the maximum lengths of the respective lengths L2 is discriminated from the other lengths L2, the maximum lengths are also referred to as "the lengths L2a") are equivalent with "the maximum lengths of the respective first lengths" in the present invention, and the lengths L2a are the maximum lengths of the respective lengths along the rotating direction of the projecting end surfaces of the convex portions 40a in the servo pattern regions Asa. It should be noted that, in the magnetic disk 10A, since the address pattern is formed by encoding the address data according to Manchester code and the like, the lengths (signal lengths recognized as a high level in the hard disk drive 1) along the rotating direction of the projecting end surfaces of the respective convex portions 40a constituting the address pattern (servo pattern 40sa) at the respective same radius positions in the address pattern regions Aaa are composed of only the two types of the lengths L1 and L2.

Figure 8:
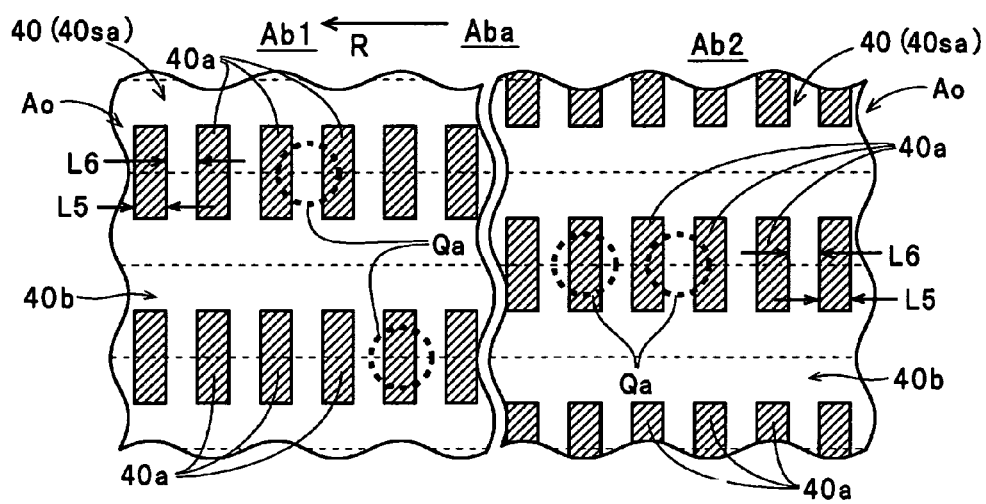
FIG. 8 is a plan view of the magnetic disk showing an example of burst patterns formed in a first burst pattern region and a second burst pattern region in the outer peripheral region.
Figure 9:
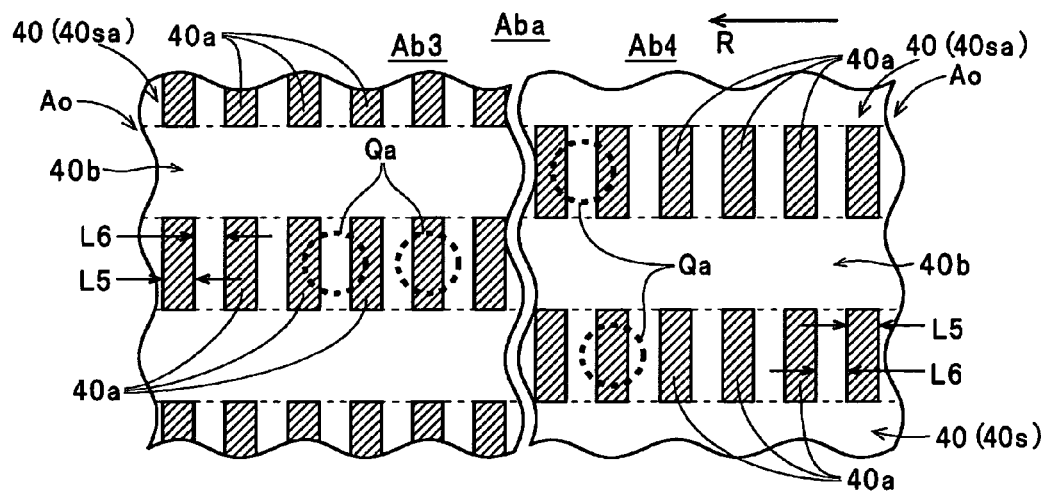
FIG. 9 is a plan view of the magnetic disk showing an example of burst patterns formed in a third burst pattern region and a fourth burst pattern region in the outer peripheral region.

Further, as shown in FIG. 3, the burst pattern regions Aba include respective burst regions, that is, first burst regions Ab1 to fourth burst regions Ab4 and non-servo signal regions Axb. In this case, the burst patterns formed in the first burst regions Ab1 to the fourth burst regions Ab4 are position detecting servo patterns for placing the magnetic head 3 on a desired track. As shown in FIGS. 8 and 9, since the plurality of convex portions 40a are formed along the rotating direction of the magnetic disk 10A across the concave portions 40b, there are formed regions in which convex portions 40a and concave portions 40b are arranged alternately along the rotating direction and the regions in which concave portions 40b are continuously arranged along the rotating direction.

In the magnetic disk 10A, the lengths L5 in the rotating direction of the projecting end surfaces of the convex portions 40a arranged along the rotating direction in the first burst regions Ab1 to the fourth burst regions Ab4 in the burst pattern regions Aba are set, for example, equal to the respective minimum lengths L1 along the rotating direction of the projecting end surfaces of the convex portions 40*a* formed in the address pattern regions Aaa at the respective same radius positions and to the respective lengths L5 along the rotating direction of the projecting end surfaces of the convex portions 40*a* formed in the preamble pattern regions Ap at the respective same radius positions. Further, the lengths L6 along the rotating direction of the concave portions 40*b* between the convex portions 40*a* formed in the burst pattern regions Aba are set, for example, equal to the respective lengths L6 along the rotating direction of the concave portions 40*b* formed in the preamble pattern regions Ap at the respective same radius positions. It should be noted that the lengths L5 along the rotating direction of the convex portions 40*a* formed in the first burst regions Ab1 to the fourth burst regions Ab4 and the lengths L6 along the rotating direction of the concave portions 40*b* between the convex portions 40*a* are not limited to the above examples. Further, the lengths L5 of the convex portions 40*a* and the lengths L6 of the concave portions 40*b* may be set to respective lengths that are different from each other.

Further, as shown in FIG. 3, the non-servo signal regions Ax are respectively formed between the data recording regions At and the preamble pattern regions Ap, between the preamble pattern regions Ap and the address pattern regions Aaa, between the address pattern regions Aaa and the burst pattern regions Aba, and between the burst pattern regions Aba and the data recording regions At. Further, in the burst pattern regions Aba, the non-servo signal regions Axb are respectively formed between the first burst regions Ab1 and the second burst regions Ab2, between the second burst regions Ab2 and the third burst regions Ab3, and between the third burst regions Ab3 and the fourth burst regions Ab4, as described above. These non-servo signal regions Ax, Axb are the regions in which patterns are formed to prevent the deterioration of the surface smoothness of the magnetic disk 10A when it is manufactured. As an example, patterns of the same type (the same shape) as the various patterns formed in the data recording regions At, the preamble pattern regions Ap, and the burst pattern regions Aba (the first burst regions Ab1 to the fourth burst regions Ab4), as described above, are formed as dummy patterns.

Specifically, as shown in FIG. 3, a concave/convex pattern 40 of the same type as the servo pattern 40*sa* formed in the preamble pattern regions Ap is formed in the non-servo signal regions Ax (the non-servo signal regions Ax on the leftmost side in the figure) between the data recording regions At and the preamble pattern regions Ap. A concave/convex pattern 40 of the same type as the servo pattern 40*sa* formed in the fourth burst regions Ab4 in the burst pattern regions Aba is formed in the non-servo signal regions Ax (the non-servo signal regions Ax on the rightmost side in the figure) between the burst pattern regions Aba and the data recording regions At. A concave/convex pattern 40 of the same type as the servo pattern 40*sa* formed in the preamble pattern regions Ap is formed in the non-servo signal regions Ax between the preamble pattern regions Ap and the address pattern regions Aaa. A concave/convex pattern 40 of the same type as the servo pattern 40*sa* formed in the first burst regions Ab1 of the burst pattern regions Aba is formed in the non-servo signal regions Ax between the address pattern regions Aaa and the burst pattern regions Aba.

In the non-servo signal regions Axb between the first burst regions Ab1 and the second burst regions Ab2 (the non-servo signal regions Axb on the left side in FIG. 3), a concave/convex pattern 40 of the same type as the servo pattern 40*sa* formed in the first burst regions Ab1 is formed on the first burst regions Ab1 side in the rotating direction as well as a concave/convex pattern 40 of the same type as the servo pattern 40*sa* formed in the second burst regions Ab2 is formed on the second burst pattern regions Ab2 side in the rotating direction. Further, in the non-servo signal regions Axb between the second burst regions Ab2 and the third burst regions Ab3 (the non-servo signal regions Axb at the center in the figure), a concave/convex pattern 40 of the same type as the servo pattern 40*sa* formed in the second burst regions Ab2 is formed on the second burst regions Ab2 side in the rotating direction as well as a concave/convex pattern 40 of the same type as the servo pattern 40*sa* formed in the third burst regions Ab3 is formed on the third burst pattern regions Ab3 side in the rotating direction. Further, in the non-servo signal regions Axb between the third burst regions Ab3 and the fourth burst regions Ab4 (the non-servo signal regions Axb on the right side in the figure), a concave/convex pattern 40 of the same type as the servo pattern 40*sa* formed in the third burst regions Ab3 is formed on the third burst regions Ab3 side in the rotating direction as well as a concave/convex pattern 40 of the same type as the servo pattern 40*sa* formed in the fourth burst regions Ab4 is formed on the fourth burst pattern regions Ab4 side in the rotating direction.

Accordingly, in the magnetic disk 10A, it is visually recognized that the preamble pattern regions Ap, the address pattern regions Aaa, and the burst pattern regions Aba are continuously formed in contact with each other as if no non-servo signal region Ax exists in the servo pattern regions Asa as well as it is visually recognized that the respective burst regions from the first burst regions Ab1 to the fourth burst regions Ab4 are continuously formed in contact with each other as if no non-servo signal region Axb exists in the burst pattern regions Aba. However, when data is recorded to and reproduced from the magnetic disk 10A, although magnetic signals are read from the non-servo signal regions Ax, Axb by the magnetic head 3, the data corresponding to the concave/convex patterns 40 formed in the non-servo signal regions Ax, Axb is determined different from servo data for tracking servo data by the control section 6. Accordingly, the respective lengths of the convex portions 40*a* and the concave portions 40*b* formed in the non-servo signal regions Ax, Axb can be arbitrarily set within the range in which the surface smoothness of the magnetic disk 10A can be enhanced without being affected by the lengths of the other patterns. Further, the shapes of the convex portions 40*a* and the concave portions 40*b* may be also arbitrarily set.

As described above, in the magnetic disk 10A, the lengths L3 along the radius direction of the convex portions 40*a* formed in the data recording regions At are set equal to or less than the respective maximum lengths of the respective lengths along the rotating direction of the projecting end surfaces of the convex portions 40*a* formed in the servo pattern regions Asa (in the example, the maximum lengths L2*a* of the respective lengths along the rotating direction of the projecting end surfaces of the convex portions 40*a* in the address pattern regions Aaa in the outer peripheral region Ao). Accordingly, when circular regions Qa whose diameters are equal to the maximum lengths L2*a* in the address pattern regions Aaa are disposed to any portions in the data recording regions At as shown in FIG. 5, at least a portion of the concave portions 40*b* is included in the circular regions Qa. Further, in the magnetic disk 10A, the lengths L5 along the rotating direction of the convex portions 40*a* formed in the preamble pattern regions Ap are set equal to the respective minimum lengths L1 of the respective lengths along the rotating direction of the projecting end surfaces of the convex portions 40*a* formed at the respective same radius positions in the servo pattern regions Asa, as described above. In this case, since the lengths L1 are one half the lengths L2, as described above, when the circular regions Qa whose diameters are equal to the maximum lengths L2a in the address pattern regions Aaa are disposed to any portions in the preamble pattern regions Ap as shown in FIG. 6, at least a portion of the concave portions 40b is included in the circular regions Qa.

Further, in the magnetic disk 10A, the address pattern, in which the address data is encoded according to Manchester code and the like, is formed in the address pattern regions Aaa, as described above. Accordingly, even if a large number of "1"s continuously exist in the address data, the convex portions 40a are not continuously formed along the rotating direction, and the concave/convex pattern 40 (address pattern) is formed by the convex portions 40a having the lengths L1 (minimum lengths), the convex portions 40a having the lengths L2 (maximum lengths), and the concave portions 40b. In this case, since the lengths L1 are one half the lengths L2, when the circular regions Qa whose diameters are equal to the maximum lengths L2a in the address pattern regions Aaa are disposed to any portions in the address pattern regions Aaa, at least a portion of the concave portions 40b is included in the circular regions Qa. It should be noted that, in a state in which the circular regions Qa disposed in the address pattern regions Aaa are in coincidence with the inscribed circles of the projecting end surfaces of the convex portions 40a having the maximum lengths L2a in the address pattern regions Aaa, the boundary portions between the convex portions 40a and the concave portions 40b are included in the circular regions Qa. In this case, the state in which the boundary portions between the convex portions 40a and the concave portions 40b are included is referred to as "a state in which a part of the concave portions 40b is included" in the present specification, as described above.

Further, in the magnetic disk 10A, the lengths L5 along the rotating direction of the convex portions 40a formed in the first burst regions Ab1 to the fourth burst regions Ab4 in the burst pattern regions Aba are set equal to the respective minimum lengths L1 of the respective lengths along the rotating direction of the projecting end surfaces of the convex portions 40a formed at the respective same radius positions in the servo pattern regions Asa, as described above. In this case, since the lengths L1 are one half the lengths L2, when the circular regions Qa whose diameters are equal to the maximum lengths L2a in the address pattern regions Aaa are disposed to any portions in the first burst regions Ab1 to the fourth burst regions Ab4 as shown in FIGS. 8 and 9, at least a portion of the concave portions 40b is included in the circular regions Qa.

Further, in the magnetic disk 10A, the concave/convex pattern 40 of the same type as the servo pattern 40sa formed in the preamble pattern regions Ap and the burst pattern regions Aba (the first burst regions Ab1 to the fourth burst regions Ab4) is formed in the non-servo signal regions Ax, Axb, as described above. Accordingly, even if the circular regions Qa are disposed at any positions in the preamble pattern regions Ap and the burst pattern regions Aba (the first burst regions Ab1 to the fourth burst regions Ab4) as shown in FIG. 3, when the circular regions Qa are disposed in any portions of the non-servo signal regions Ax, Axb in which the servo pattern 40sa of the same type as these regions are formed in the magnetic disk 10A in which at least a portion of the concave portions 40b is included in the circular regions Qa, at least a portion of the concave portions 40b is included in the circular regions Qa.

As described above, in the magnetic disk 10A, the data track pattern 40t and the servo pattern 40sa are arranged by forming the concave portions 40b such that at least a part of the concave portions 40b is included in the arbitrarily disposed circular regions Qa in the entire areas of the data recording regions At, and the servo pattern regions Asa. In other words, in the entire areas of the data recording regions At and the servo pattern regions Asa of the magnetic disk 10A, the lengths in any direction of the projecting end surfaces of the convex portions 40a (in the example, any of the lengths along the rotating direction of the convex portions 40a and the lengths along the radius direction thereof) are shorter than (or equal to) the diameters of the circular regions Qa (in the example, the lengths L2a). That is, in the magnetic disk 10A, the data track pattern 40t and the servo pattern 40sa are formed such that the convex portions 40a whose projecting end surfaces are excessively wide do not exist in any region of the data recording regions At and the servo pattern regions Asa, unlike in the conventional magnetic disk 10z.

Next, a method of manufacturing the magnetic disk 10A will be explained.

Figure 10:
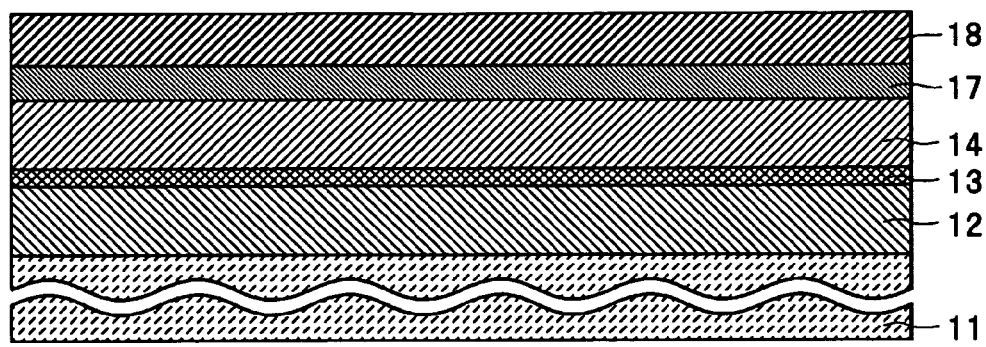
FIG. 10 is a cross-sectional view showing a layer structure of an intermediate body.
Figure 11:
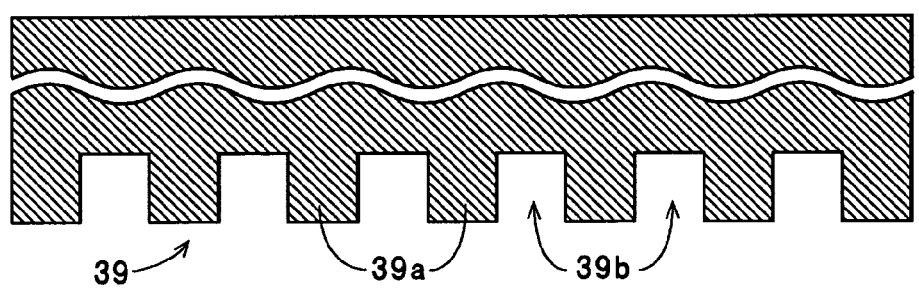
FIG. 11 is a cross-sectional view of a stamper.

When the magnetic disk 10A described above is manufactured, an intermediate body 20 shown in FIG. 10 and a stamper 30 shown in FIG. 11 are used. In this case, as shown in FIG. 10, the intermediate body 20 is composed of the soft magnetic layer 12, the intermediate layer 13, and the magnetic layer 14 formed on the glass substrate 11 in this order. Further, a mask layer 17 and a resin layer (resist layer) 18 having a thickness of about 80 nm are formed on the magnetic layer 14. In contrast, the stamper 30 is an example of a stamper for manufacturing the magnetic recording medium according to the present invention. As shown in FIG. 11, a concave/convex pattern 39 that can form a concave/convex pattern 41 for forming the concave/convex pattern 40 (the data track pattern 40t and the servo pattern 40sa) of the magnetic disk 10A is formed on the stamper 30, and the stamper 30 is arranged to enable manufacturing the magnetic disk 10A by an imprint method. In this case, the concave/convex pattern 39 of the stamper 30 is formed such that convex portions 39a correspond to the concave portions 40b of the concave/convex pattern 40 of the magnetic disk 10A and concave portions 39b correspond to the convex portions 40a of the concave/convex pattern 40.

Figure 12:
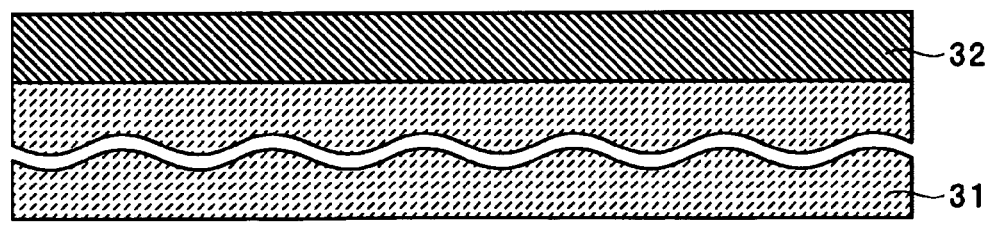
FIG. 12 is a cross-sectional view showing a state in which a resist layer is formed on a glass substrate.
Figure 16:
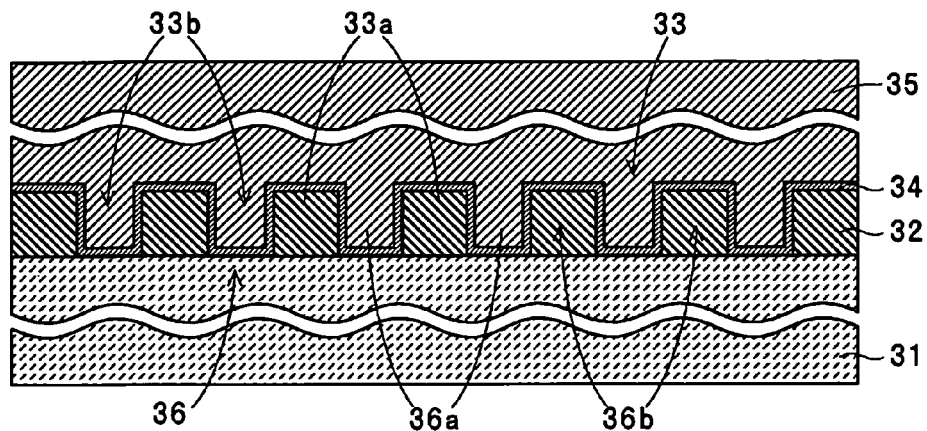
FIG. 16 is a cross-sectional view of a state in which other nickel layer is formed by plating processing making use of the thus formed nickel layer.

When the stamper 30 is manufactured, first, after a positive-type resist, for example, is spin coated on an glass substrate 31, the positive-type resist is subjected to bake processing, thereby a resist layer 32 having a thickness of about 150 nm is formed on the glass substrate 31 as shown in FIG. 12. Next, as shown in FIG. 13, a latent image 32b (the track pattern and the servo pattern) is formed on the resist layer 32 by irradiating an electron beam 32a onto the portions corresponding to the concave portions 39b of the stamper 30 (that is, the portions corresponding to the convex portions 40a of the magnetic disk 10A). Subsequently, as shown in FIG. 14, a concave/convex pattern 33 (convex portions 33a and concave portions 33b) composed of the resist layer 32 is formed on the glass substrate 31 by subjecting the resist layer 32 to development processing. Next, as shown in FIG. 15, a nickel layer 34 having a thickness of about 30 nm is formed by sputtering so that the nickel layer 34 covers the convex portions 33a and the concave portions 33b of the concave/convex pattern 33. Subsequently, as shown in FIG. 16, a nickel layer 35 is formed on the nickel layer 34 by executing plating processing using the nickel layer 34 as an electrode. At the time, the concave/convex pattern 33 formed by the resist layer 32 is transferred onto the laminated body of the nickel layers 34 and 35 and concave portions 36b are formed to the portions of the convex portions 33a, in the concave/convex pattern 33 as well as convex portions 36a are formed to the portions of the concave portions 33b, thereby a concave/convex pattern 36 is formed to the laminated body of the nickel layers 34, 35.

Figure 17:
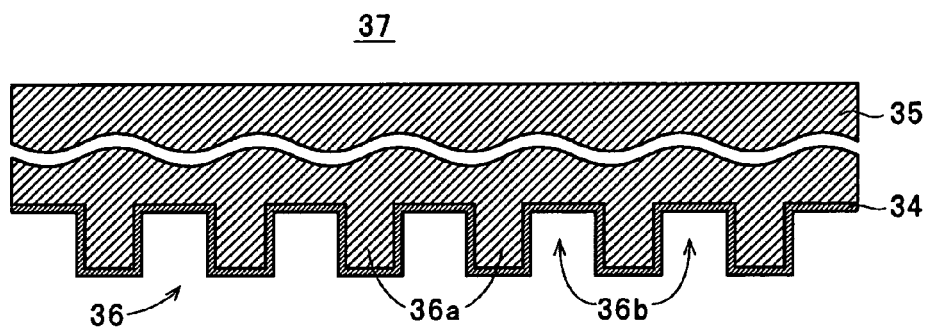
FIG. 17 is a cross-sectional view of a stamper formed by exfoliating the laminated body of both the nickel layers from the glass substrate.
Figure 18:
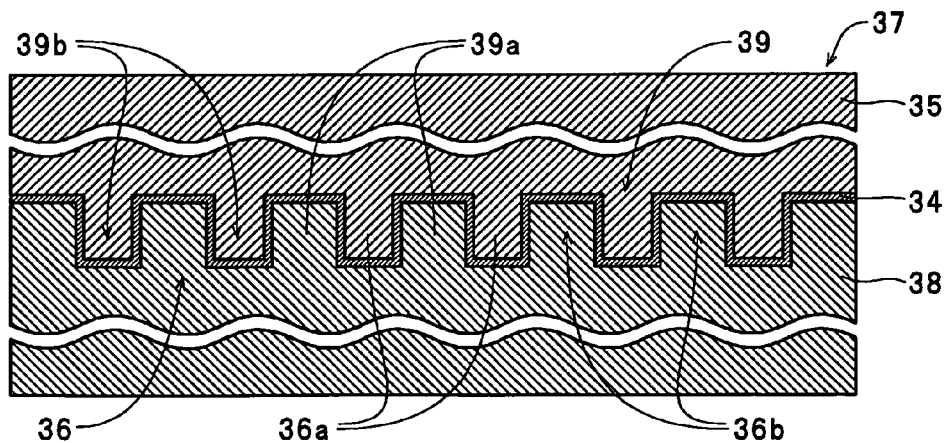
FIG. 18 is a cross-sectional view of a state in which a nickel layer is formed on the surface of the stamper on which the concave/convex pattern is formed (state in which the nickel layer is transferred onto the concave/convex pattern of the stamper)

Subsequently, the resist layer 32 between the laminated body of the nickel layers 34, 35 and the glass substrate 31 is eliminated by dipping the glass substrate 31, the resist layer 32, and the laminated body of the glass substrate 31 into a resist exfoliation liquid. With this operation, the laminated body of the nickel layers 34, 35 is exfoliated from the glass substrate 31, thereby a stamper 37 is completed as shown in FIG. 17. Next, the stamper 30 (mother stamper) is manufactured using the stamper 37 as a master stamper. Specifically, first, an oxide film is formed on the surface of the stamper 37 on which the concave/convex pattern 36 is formed by subjecting the stamper 37 to surface processing. Next, as shown in FIG. 18, the stamper 37 on which the oxide film is formed is subjected to plating processing to thereby form a nickel layer 38 on the stamper 37. At the time, the concave/convex pattern 36 of the stamper 37 is transferred onto the nickel layer 38 and concave portions 39b are formed to the portions of the convex portions 36a as well as convex portions 39a are formed to the portions of the concave portions 36b, thereby a concave/convex pattern 39 is formed to the nickel layer 38. Next, after the stamper 37 is exfoliated from the nickel layer 38, the back surface of the nickel layer 38 (back surface with respect to the surface on which the concave/convex pattern 39 is formed) is subjected to polish processing and flattened, thereby the stamper 30 is completed as shown in FIG. 11.

In contrast, when the intermediate body 20 is manufactured, first, after the soft magnetic layer 12 is formed on the glass substrate 11 by sputtering CoZrNb alloy on the glass substrate 11, the intermediate layer 13 is formed by sputtering an intermediate layer forming material on the soft magnetic layer 12. Next, the magnetic layer 14 having a thickness oxide film about 15 nm is formed by sputtering CoCrPt alloy on the intermediate layer 13. Subsequently, the mask layer 17 is formed on the magnetic layer 14, and further the resin layer 18 having a thickness of about 80 nm is formed by spin coating, for example, a resist on the mask layer 17. With this operation, the intermediate body 20 is completed as shown in FIG. 10.

Figure 19:
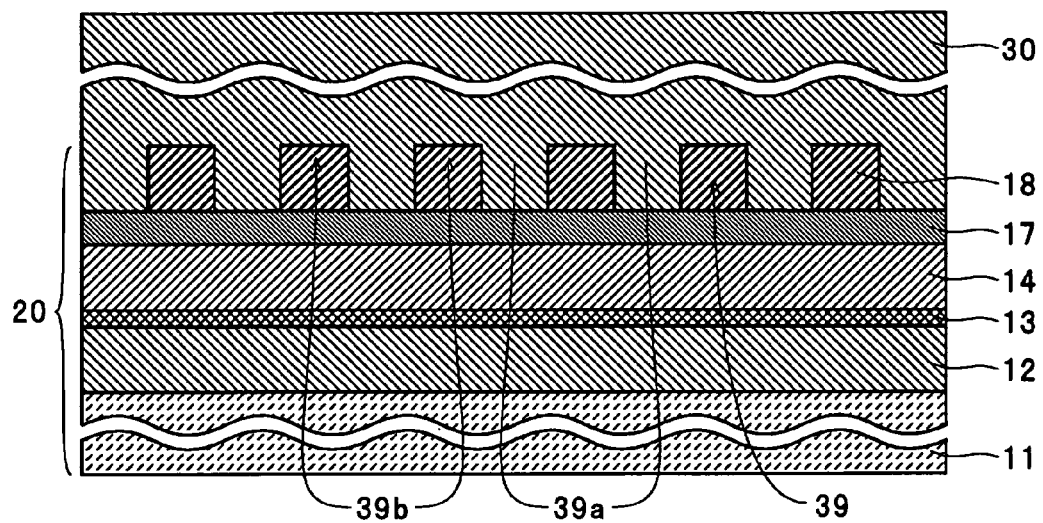
FIG. 19 is a cross-sectional view of a state in which the concave/convex pattern of the stamper is pressed against a resin layer of the intermediate body.
Figure 20:
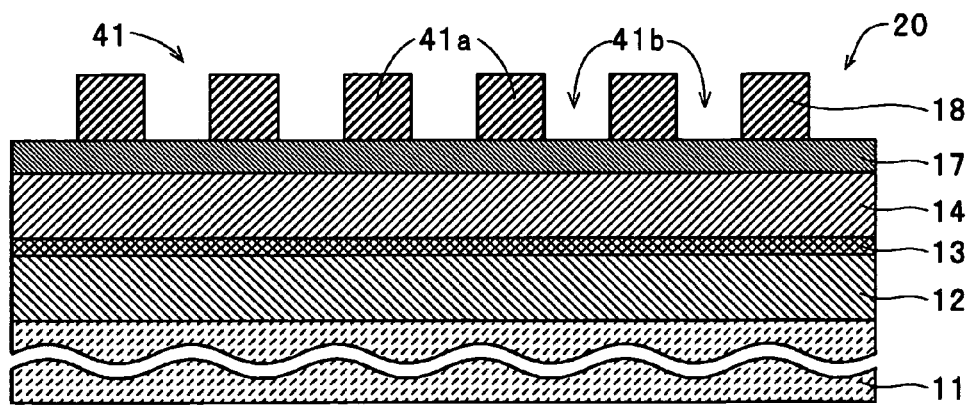
FIG. 20 is a cross-sectional view of a state in which the stamper is exfoliated from the resin layer in the state shown in FIG. 19 and a concave/convex pattern (resin mask) is formed on a mask layer.
Figure 21:
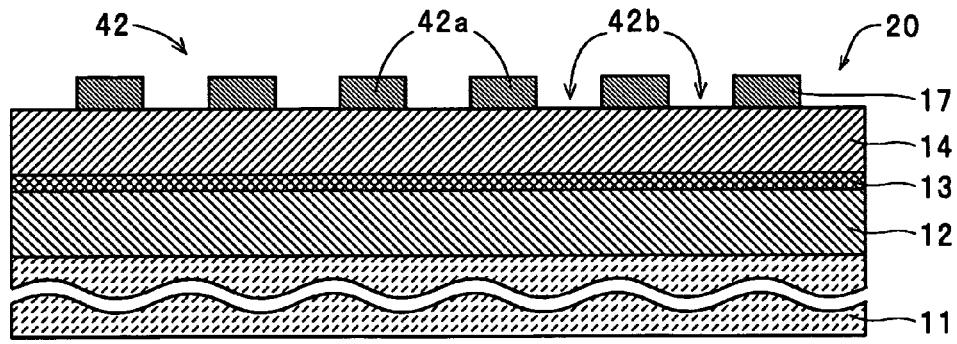
FIG. 21 is a cross-sectional view of a state in which the mask layer is etched using the concave/convex pattern shown in FIG. 20 as a mask and a concave/convex pattern (mask) is formed on a magnetic layer.

Subsequently, as shown in FIG. 19, the concave/convex pattern 39 of the stamper 30 is transferred onto the resin layer 18 of the intermediate body 20 by the imprint method. Specifically, the surface of the stamper 30 on which the concave/convex pattern 39 is formed is pressed against the resin layer 18 of the intermediate body 20, thereby the convex portions 39a of the concave/convex pattern 39 are forcibly inserted into the resin layer 18 of the intermediate body 20. At the time, the resist (resin layer 18) of the portions into which the convex portions 39a are forcibly inserted moves into the concave portions 39b of the concave/convex pattern 39. Thereafter, the stamper 30 is exfoliated from the intermediate body 20 and further the resin (not shown) remaining on a bottom surface is eliminated by oxygen plasma processing, thereby a concave/convex pattern 41 composed of the resin layer 18 is formed on the mask layer 17 in the intermediate body 20 as shown in FIG. 20. In this case, the height of the convex portions 41a (the depth of concave portions 41b) of the concave/convex pattern 41 is set to about 130 nm.

Figure 22:
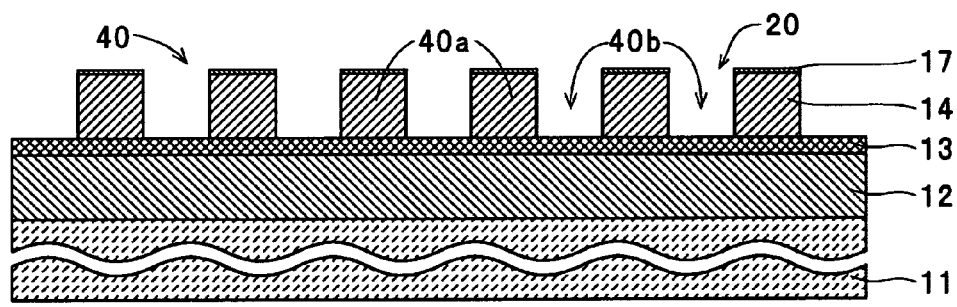
FIG. 22 is a cross-sectional view of a state in which a concave/convex pattern is formed on an intermediate layer by etching the magnetic layer using the concave/convex pattern shown in FIG. 21 as a mask.

Next, the mask layer 17, which is exposed from the mask (convex portions 41a) on the bottoms of the concave portions 41b of the concave/convex pattern 41, is etched by executing etching processing using the concave/convex pattern 41 (resin layer 18) as a mask, thereby a concave/convex pattern 42 having convex portions 42a and concave portions 42b is formed to the mask layer 17 of the intermediate body 20. Subsequently, the magnetic layer 14, which is exposed from the mask (convex portions 42a) on the bottoms of the concave portions 42b in the concave/convex pattern 42, is etched by executing etching processing using the concave/convex pattern 42 (mask layer 17) as a mask, thereby the concave/convex pattern 40 having the convex portions 40a, and the concave portions 40b is formed to the magnetic layer 14 of the intermediate member 20 as shown in FIG. 22. With this operation, the data track pattern 40t and the servo pattern 40sa (concave/convex pattern 40) are formed on the intermediate layer 13. Next, by selectively executing etching process to the mask layer 17 remaining on the convex portions 40a, the remaining mask layer is completely eliminated, thereby the projecting end surfaces of the convex portions 40a are exposed.

Figure 23:
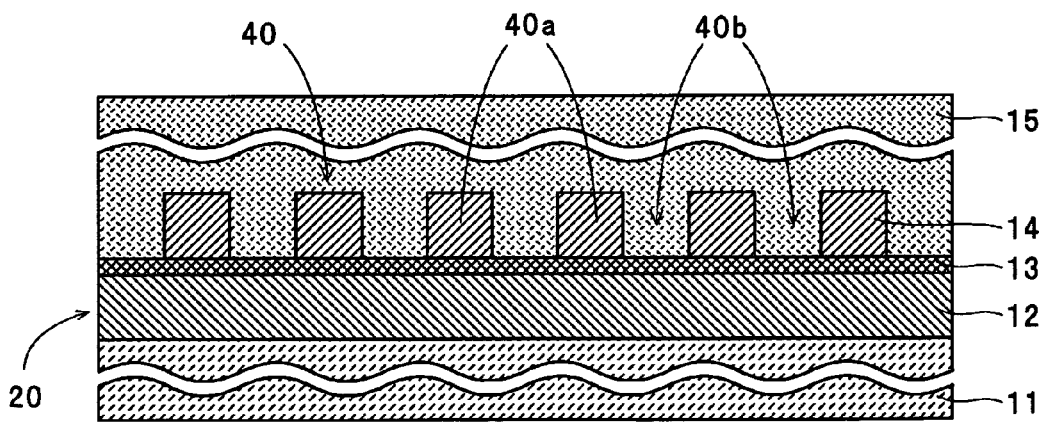
FIG. 23 is a cross-sectional view of the intermediate body in a state in which after the mask layer on the concave/convex pattern shown in FIG. 22 is removed, a layer of a non-magnetic material is formed so as to cover the concave/convex pattern.

Next, $SiO_2$ as the non-magnetic material 15 is sputtered as shown in FIG. 23. At the time, the non-magnetic material 15 is sufficiently sputtered so that the concave portions 40b are completely filled with the non-magnetic material 15 as well as a layer of the non-magnetic material 15 having a thickness of, for example, about 60 nm is formed on the convex portions 40a. Subsequently, ion beam etching is executed to the layer of the non-magnetic material 15 on the magnetic layer 14 (on the convex portions 40a and on the concave portions 40b). At the time, the ion beam etching is continued until the projecting end surfaces, which have the lengths L2a along the rotating direction, of the convex portions 40a, are exposed from the non-magnetic material 15 in the address pattern regions Aaa on the outer peripheral side of the intermediate body 20 (portion made to the outer peripheral region Ao of the magnetic disk 10A later).

In this case, in the magnetic disk 10A (intermediate body 20), the lengths of the projecting end surfaces of the convex portions 40a in any direction are shorter than (or equal to) the diameters of the circular regions Qa (in the example, the maximum lengths L2a) in the entire areas of the data recording regions At and the servo pattern regions Asa, as described above. Accordingly, since the convex portions 40a whose projecting end surfaces are excessively wide (convex portions 40a which are long in all the directions) do not exist in any region of the data recording regions At and the servo pattern regions Asa, no thick residual is formed on the convex portions 40a in the servo pattern regions Asa and on the convex portions 40a in the data recording regions At, unlike in the conventional magnetic disk 10z, thereby the projecting end surfaces (upper surfaces) of the respective convex portions 40a are exposed from the non-magnetic material 15. The ion beam etching to the layer of the non-magnetic material 15 is finished by the above operation, thereby the surface of the intermediate body 20 is flattened. Subsequently, after the protection layer 16 is formed by forming a thin film of diamond-like carbon (DLC) so as to cover the surface of the intermediate body 20 by a CVD method, a fomblin lubricant is applied to the surface of the protection layer 16 in a thickness of, for example, about 2 nm. With this operation, magnetic disk 10A is completed as shown in FIG. 4.

In the hard disk drive 1 on which the magnetic disk 10A is mounted, when data is recorded to and reproduced from the magnetic disk 10A, the data corresponding to the concave/convex patterns 40 formed to the non-servo signal regions Ax and to the non-servo signal regions Axb is determined different from servo data for tracking servo by the control section 6, as described above. Specifically, the control section 6 places the magnetic head 3 on a desired track by driving the actuator 3b by controlling the driver 5 based on the data, which corresponds to the concave/convex pattern 40 formed to the preamble pattern regions Ap, the address pattern regions Aaa, and the burst pattern regions Aba (except the non-servo signal regions Axb) of the data including the servo data output from the detection section 4.

Further, in the hard disk drive 1, when the address data is extracted based on the data output from the detection section 4 in correspondence to the concave/convex pattern 40 formed to the address pattern regions Aaa, the control section 6 decodes the output data from the detection section 4 assuming that the output data is encoded according to Manchester code, Biphase-M Code, and the like. As a result, a tracking servo control is executed based on the address data read out from the address pattern regions Aaa, the burst signal read out from the burst pattern regions Aba, and the like, thereby the magnetic head 3 can be placed on a desired data recorded track (convex portions 40a). With this operation, data can be recorded and reproduced through the magnetic head 3 placed on the convex portions 40a (data recording tracks) in the data recording regions At.

As described above, according to the magnetic disk 10A and the hard disk drive 1, the concave portions 40b are formed to the address pattern regions Aaa such that the maximum lengths L2 of the respective lengths along the rotating direction of the projecting end surfaces of the respective convex portions 40a in the respective same radius regions are set to lengths double the minimum lengths L1 along the rotating direction of the projecting end surfaces of the respective convex portions 40a (first lengths of the present invention). As a result, there are no convex portions 40a whose lengths along the rotating direction of the projecting end surfaces are excessively long (convex portions 40a which are long in all the directions) in the address pattern regions Aaa in which the lengths along the radius direction of the projecting end surfaces of the convex portions 40a tend to increase. Accordingly, when the layer of the non-magnetic material 15 formed so as to cover the concave/convex pattern 40 in the servo pattern regions Asa is etched, a thick residual can be prevented from being formed on the convex portions 40a in the address pattern regions Aaa, unlike in the conventional magnetic disk 10z. With this arrangement, there can be provided the magnetic disk 10A, which has excellent flatness in the address pattern regions Aaa and moreover can securely read the address data, and the hard disk drive 1 including the magnetic disk 10A. Further, the difference between the maximum lengths L2 and the minimum lengths L1 along the rotating direction of the convex portions 40a in the address pattern regions Aaa is small. Accordingly, even if the projecting end surfaces of the convex portions 40a having the lengths L2 are sufficiently etched until they are exposed from the non-magnetic material 15, the convex portions 40a having the lengths L1 can be prevented from being excessively etched. With this arrangement, there can be provided the magnetic disk 10A, which can accurately read the address data, and the hard disk drive 1 including the magnetic disk 10A.

According to the magnetic disk 10A and the hard disk drive 1, when the circular regions Qa whose diameters are equal to the maximum lengths L2a of the respective lengths L2 (first lengths) are disposed in any portions in the servo pattern regions Asa, since the concave portions 40b are formed to the servo pattern regions Asa such that at least a portion of the concave portions 40b is included in the circular regions Qa, no convex portions 40a which are excessively long in all the direction (which have excessively wide projecting end surfaces) exist not only in the entire area of the address pattern regions Aaa but also in the entire area of the servo pattern regions Asa. As a result, when the layer of the non-magnetic material 15 formed so as to cover the concave/convex pattern 40 in the servo pattern regions Asa is etched, a thick residual can be prevented from being formed on the convex portions 40a in the entire area of the servo pattern regions Asa including the non-servo signal regions Ax, Axb, unlike in the conventional magnetic disk 10z. With this arrangement, there can be provided the magnetic disk 10A, which has excellent flatness in the servo pattern regions Asa and moreover can securely read data for controlling tracking servo, and the hard disk drive 1 including the magnetic disk 10A.

According to the magnetic disk 10A and the hard disk drive 1, since the respective data recording tracks (convex portions 40a) are formed such that the lengths L3 along the radius direction of the substrate are set equal to or less than the maximum lengths L2a of the respective lengths L2 (first lengths), no convex portions 40a whose projecting end surfaces have a length excessively long along the radius direction thereof (convex portions 40a that are long in all the directions) exist in the data recording regions At in which the lengths of the projecting end surfaces of the convex portions 40a along the rotating direction increase. Accordingly, when the layer of the non-magnetic material 15 formed so as to cover the concave/convex pattern 40 in the data recording regions At is etched, a thick residual can be prevented from being formed on the convex portions 40a (data recording tracks). Thus, there can be provided the magnetic disk 10A which has excellent flatness in both the servo pattern regions Asa and the data recording regions At (the entire area of the magnetic disk 10A) and moreover can stably record and reproduce data, and the hard disk drive 1 including the magnetic disk 10A.

According to the hard disk drive 1, it is provided with the magnetic disk 10A and the control section 6 for executing tracking servo control processing based on a predetermined signal read from the servo pattern regions Asa of the magnetic disk 10A. As a result, data can be recorded and reproduced through the magnetic head 3 placed on the convex portions 40a (data recording tracks) in the data recording regions At without being affected by the existence of the concave/convex pattern 40 (dummy pattern) formed in the non-servo signal regions Ax.

Further, according to the stamper 30 for manufacturing the magnetic disk 10A, the concave/convex pattern 39 is formed which has the convex portions 39a formed in correspondence to the concave portions 40b of the concave/convex pattern 40 of the magnetic disk 10A and the concave portions 39b formed in correspondence to the convex portions 40a of the concave/convex pattern 40 of the magnetic disk 10A. As a result, when the intermediate body 20 is subjected to the imprint processing, there can be formed the concave/convex pattern 41 in which no convex portions 41a whose projecting end surfaces are excessively wide exist in the address pattern regions Aaa and the like. Therefore, when etching processing is executed to the intermediate body 20 using a mask whose concave/convex positional relation is in coincidence with the concave/convex pattern 41 (in the example, the concave/convex pattern 42), convex portions 40a having wide projecting end surfaces can be prevented from being formed in the address pattern regions Aaa and the like. Therefore, when the layer of the non-magnetic material 15 formed so as to cover the concave/convex pattern 40 is etched, a thick residual can be prevented from being formed on the convex portions 40a in the address pattern regions Aaa and the like. With this arrangement, the magnetic disk 10A, which has excellent flatness and can securely read the address data and the like, can be manufactured. Further, since no excessively wide concave portion 39b exist in the stamper 30 in correspondence to the projecting end surfaces of the convex portions 40a of the magnetic disk 10A, when the concave/convex pattern 39 is pressed against the resin layer 18 of the intermediate body 20, the insufficient height of the convex portions 41a due to the insufficient amount of movement of the resin material (resin layer 18) into the concave portions 39b can be prevented (insufficient thickness of the resin mask). Accordingly, when the mask layer 17 is etched using the concave/convex pattern 41 as a mask, the convex portions 41a can be prevented from disappearing prior to the completion of etching of the mask layer 17. As a result, the concave/convex pattern 42 having the sufficiently deep concave portions 42b can be formed on the magnetic layer 14. With this arrangement, when the magnetic layer 14 is etched using the concave/convex pattern 42 as a mask, the concave/convex pattern 40 having the sufficiently deep concave portions 40b can be formed on the intermediate layer 13.

Next, an example, in which a magnetic disk 10B as another example of the magnetic recording medium according to the present invention is mounted on the hard disk drive 1, will be explained with reference to the drawings. It should be noted that the components which are common to those of the magnetic disk 10A described above and the hard disk drive 1 on which the magnetic disk 10A is mounted are denoted by common reference numerals and the description thereof is omitted.

Figure 24:
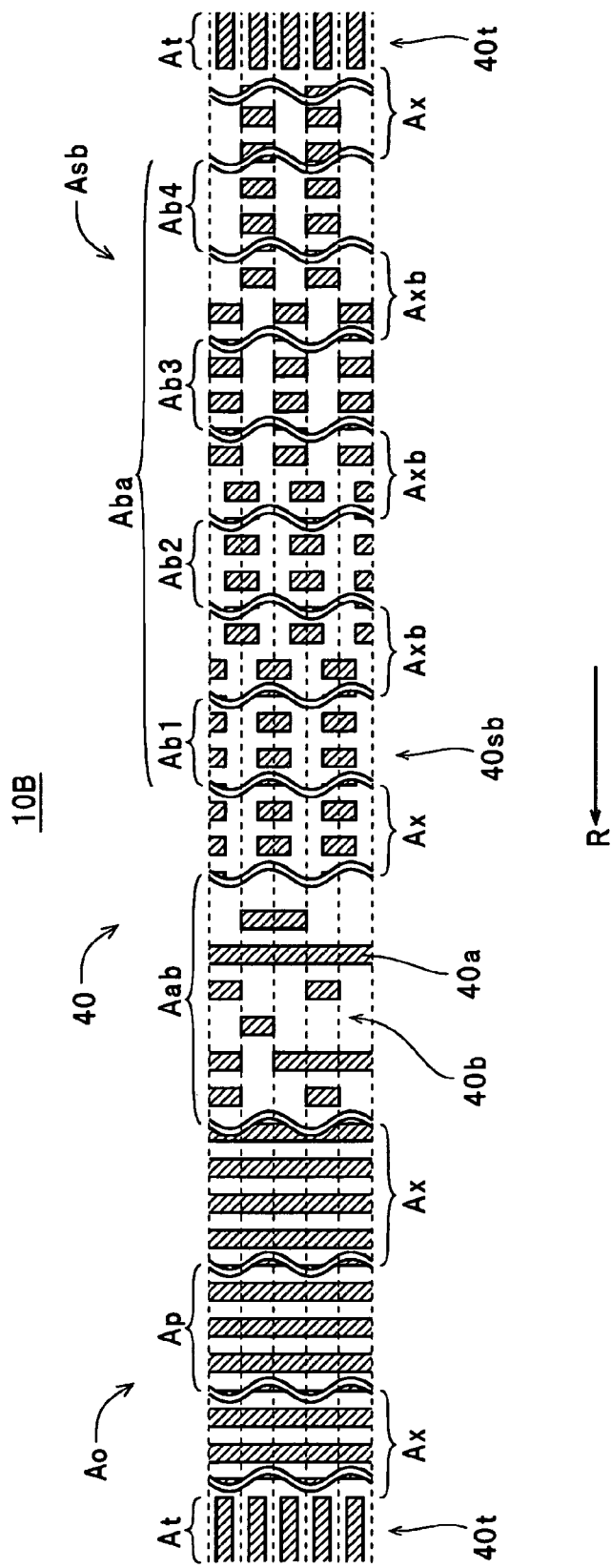
FIG. 24 is a plan view of another magnetic disk showing an example of various types of patterns formed in a data recording region and a servo pattern region in an outer peripheral region.

In the magnetic disk 10B, servo pattern regions Asb are formed between data recording regions At in place of the servo pattern regions Asa in the magnetic disk 10A as shown in FIG. 24. The servo pattern regions Asb have address pattern regions Aab in place of the address pattern regions Aaa of the servo pattern regions Asa of the magnetic disk 10A. In this case, in the magnetic disk 10B, a servo pattern 40sb formed in preamble pattern regions Ap, address pattern regions Aab, and burst pattern regions Aba is equivalent to a pattern corresponding to "a predetermined signal" (control signal for tracking servo control) in the present invention. In the magnetic disk 10B, the lengths L3 along a radius direction of convex portions 40a (data recording tracks) of a data track pattern 40t formed in the data recording regions At are set equal to or less than respective the maximum lengths (lengths L1a to be described later: refer to FIG. 25) of the respective lengths along a rotating direction of the projecting end surfaces of convex portions 40a formed in the servo pattern regions Asb. Further, the lengths L5 along the rotating direction of the projecting end surfaces of the convex portions 40a formed in the preamble pattern regions Ap are set, as an example, equal to the respective lengths (the lengths L1 to be described later: refer to FIG. 25) along the rotating direction of the convex portions 40a formed in the address pattern regions Aab at the respective same radius positions.

Figure 25:
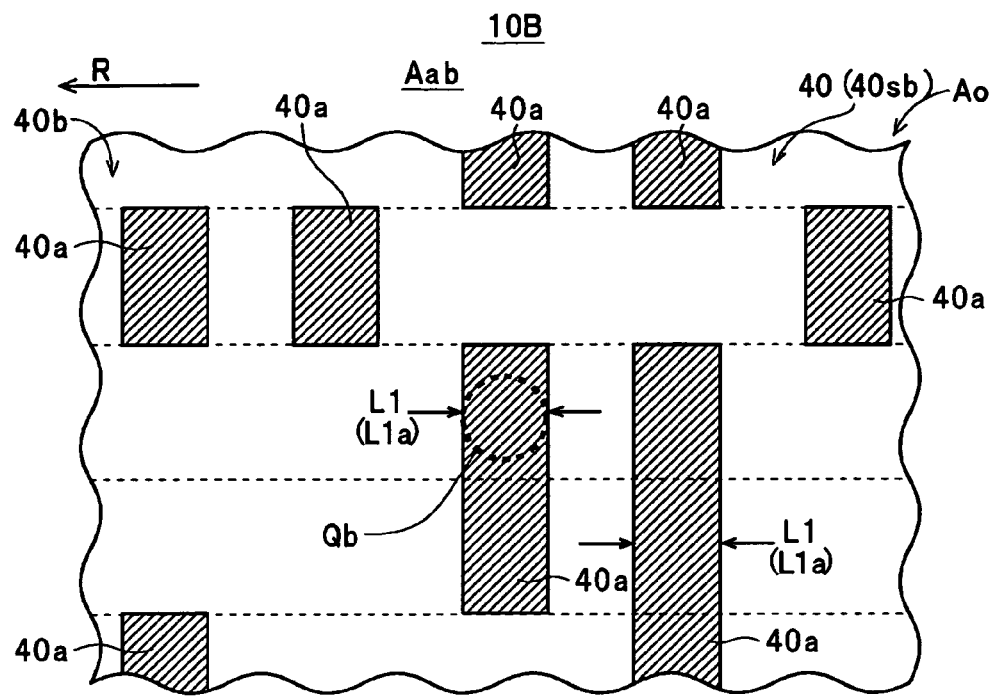
FIG. 25 is a plan view of still another magnetic disk showing an example of an address pattern formed in an address pattern region of a servo pattern region in an outer peripheral region.

As shown in FIG. 25, in the servo pattern 4Osb (address pattern) formed in the address pattern regions Aab, the respective lengths along the rotating direction of the projecting end surfaces of the convex portions 40a and the respective lengths along the rotating direction of concave portions 40b are set in correspondence to address data. In this case, in the magnetic disk 10B, the address data is encoded according to, for example, RZ (Return-to-Zero) code and the like and recorded in the address pattern regions Aaa. Specifically, since the convex portions 40a are formed in correspondence to a high level of RZ code and the like and the concave portions 40b are formed in correspondence to a low level thereof, a concave/convex pattern that corresponds to the data content of the address data is formed in the address pattern regions Aab. Therefore, in the magnetic disk 10B, the respective lengths (signal lengths recognized as a high level in a hard disk drive 1) along the rotating direction of the projecting end surfaces of the convex portions 40a constituting the address pattern (servo pattern 40sa) at the respective same radius positions in the address pattern regions Aab are composed of only one type of lengths L1 that are equal to each other (an example of "second lengths" in the present invention, also referred to as "A lengths"). In this case, in the magnetic disk 10B, the reference lengths along the rotating direction are set longer in an outer peripheral region Ao than in an inner peripheral region Ai, as described above. Accordingly, in the magnetic disk 10B, the respective lengths L1 of the projecting end surfaces of the convex portions 40a in the address pattern regions Aab of the outer peripheral region Ao are equivalent to "the maximum lengths of the second lengths" of the present invention. In the following description, when the maximum lengths of the respective lengths L1 are discriminated from the other lengths L1, it is also referred to as "the lengths L1a".

In the magnetic disk 10B, as shown in FIG. 24, the lengths L5 of the projecting end surfaces in the rotating direction of the convex portions 40a arranged along the rotating direction in a first burst regions Ab1 to a fourth burst regions Ab4 in the burst pattern regions Aba are set equal to the respective lengths L1 along the rotating direction of the projecting end surfaces of the convex portions 40a formed in the address pattern regions Aab at the respective same radius positions and to the respective lengths L5 along the rotating direction of the projecting end surfaces of the convex portions 40a formed in the preamble pattern regions Ap at the respective same radius positions. Further, the lengths L6 along the rotating direction of the concave portions 40b between the convex portions 40a formed in the burst pattern regions Aba are set, for example, equal to the respective lengths L6 along the rotating direction of the concave portions 40b formed in the preamble pattern regions Ap at the respective same radius positions. In the burst pattern regions Aba, non-servo signal regions Axb are formed between the first burst regions Ab1 and the second burst regions Ab2, between the second burst regions Ab2 and the third burst regions Ab3, and between the third burst regions Ab3 and the fourth burst regions Ab4, respectively likewise the magnetic disk 10A described above, thereby a dummy pattern is formed to prevent the deterioration of surface smoothness. Further, as shown in FIG. 24, non-servo signal regions Ax are formed between the data recording regions At and the preamble pattern regions Ap, between the preamble pattern regions Ap and the address pattern regions Aab, between the address pattern regions Aab and the burst pattern regions Aba, and between the burst pattern regions Aba and the data recording regions At, respectively likewise the magnetic disk 10A described above.

As described above, in the magnetic disk 10B, the lengths L3 along the radius direction of the convex portions 40a formed in the data recording regions At are set equal to or less than the maximum lengths of the respective lengths L1 along the rotating direction of the projecting end surfaces of the convex portions 40a formed in the servo pattern regions Asb (in the example, respective lengths L1a along the rotating direction of the convex portions 40a of the address pattern regions Aab of the outer peripheral region Ao). Accordingly, when circular regions Qb whose diameters are equal to the maximum lengths L1a in the address pattern regions Aab (refer to FIG. 25) are disposed to any portion in the data recording regions At, at least a portion of the concave portions 40b is included in the circular regions Qb. Further, in the magnetic disk 10B, the lengths L5 along the rotating direction of the convex portions 40a formed in the preamble pattern regions Ap are set equal to the respective lengths L1 along the rotating direction of the projecting end surfaces of the convex portions 40a formed at the respective same radius positions in the servo pattern regions Asb, as described above. Accordingly, when the circular regions Qb whose diameters are equal to the maximum lengths L1a in the address pattern regions Aab (refer to FIG. 25) are disposed to any portion in the preamble pattern regions Ap, at least a part of the concave portions 40b is included in the circular regions Qb. It should be noted that when the circular regions Qb disposed in the preamble pattern regions Ap are in coincidence with the inscribed circles of the projecting end surfaces of the convex portions 40a, the boundary portions between the convex portions 40a and the concave portions 40b are included in the circular regions Qb. In this case, the state in which the boundary portions between the convex portions 40a and the concave portions 40b are included is referred to as "a state in which a part of the concave portions 40b is included" in the present specification, as described above.

Further, in the magnetic disk 10B, the address pattern, in which the address data is encoded according to RZ code and the like, is formed in the address pattern regions Aab, as described above. Accordingly, even if a large number of "1"s continuously exist in the address data, the convex portions 40a are not continuously formed along the rotating direction, and the concave/convex pattern 40 (address pattern) is formed by the convex portions 40a and the concave portions 40b having the lengths L1. As a result, the lengths along the rotating direction of the projecting end surfaces of the convex portions 40a formed to the address pattern regions Aab are set to the lengths L1 that are equal to each other in the respective same radius positions. Accordingly, as shown in FIG. 25, when the circular regions Qb whose diameters are the same as the maximum lengths L1 of the address pattern regions Aab (in the example, the lengths L1a of the convex portions 40a in the outer peripheral region Ao) are disposed to any portion in the address pattern regions Aab, at least a portion of the concave portions 40b is included in the circular regions Qb. It should be noted that when the circular regions Qb disposed in the address pattern regions Aab are in coincidence with the inscribed circles of the projecting end surfaces of the convex portions 40a, the boundary portions between the convex portions 40a, the concave portions 40b are included in the circular regions Qb. Further, in the magnetic disk 10B, the lengths L5 along the rotating direction of the convex portions 40a formed in the first burst regions Ab1 to the fourth burst regions Ab4 of the burst pattern regions Aba are set equal to the respective lengths L1 along the rotating direction of the projecting end surfaces of the convex portions 40a formed at the respective same radius positions in the servo pattern regions Asb, as described above. Accordingly, when the circular regions Qb whose diameters are equal to the maximum lengths L1a in the address pattern regions Aab (refer to FIG. 25) are disposed to any portion of the first burst regions Ab1 to the fourth burst regions Ab4 of the burst pattern regions Aba, at least a portion of the concave portions 40b is included in the circular regions Qb. It should be noted that when the circular regions Qb disposed in the burst pattern regions Aba are in coincidence with the inscribed circles of the projecting end surfaces of the convex portions 40a, the boundary portions between the convex portions 40a the concave portions 40b are included in the circular regions Qb.

Further, in the magnetic disk 10B, the concave/convex pattern 40 of the same type as the servo pattern 40sb formed in the preamble pattern regions Ap and the burst pattern regions Aba (the first burst regions Ab1 to the fourth burst regions Ab4) is formed in the non-servo signal regions Ax, Axb. Accordingly, even if the circular regions Qb are disposed at any position in the preamble pattern regions Ap and the burst pattern regions Aba (the first burst regions Ab1 to the fourth burst regions Ab4), in the magnetic disk 10B in which at least a portion of the concave portions 40b is included in the circular regions Qb, when the circular regions Qb are disposed in any portion of the non-servo signal regions Ax, Axb in which the servo pattern 40sb of the same type as these regions is formed, at least a portion of the concave portions 40b is included in the circular regions Qb.

As described above, in the magnetic disk 10B, the data track pattern 40t and the servo pattern 40sb are arranged by forming the concave portions 40b such that at least a part of the concave portions 40b is included in the arbitrarily disposed circular regions Qb in the entire areas of the data recording regions At, and the servo pattern regions Asb. In other words, in the entire areas of the data recording regions At and the servo pattern regions Asb of the magnetic disk 10B, the lengths in any direction of the projecting end surfaces of the convex portions 40a (in the example, any of the lengths along the rotating direction of the convex portions 40a and the lengths along the radius direction thereof) are shorter than (or equal to) the diameters of the circular regions Qb (in the example, the lengths L1a). That is, in the magnetic disk 10B, the data track pattern 40t and the servo pattern 40sb are formed such that the convex portions 40a whose projecting end surfaces are excessively wide do not exist in any region of the data recording regions At and the servo pattern regions Asb, unlike in the conventional magnetic disk 10z.

When the magnetic disk 10B is manufactured, the intermediate body 20 shown in FIG. 10 and the stamper 30 shown in FIG. 11 are used likewise the manufacture of the magnetic disk 10A described above. In this case, the stamper 30 for manufacturing the magnetic disk 10B is another example of the stamper for manufacturing the magnetic recording medium according to the present invention, has a concave/convex pattern 39 formed thereon to form a concave/convex pattern 41 for forming the concave/convex pattern 40 (the data track pattern 40t and the servo pattern 40sb) of the magnetic disk 10B, and can manufacture the magnetic disk 10B by the imprint method. In this case, the concave/convex pattern 39 of the stamper 30 is formed such that convex portions 39a correspond to the concave portions 40b of the concave/convex pattern 40 of the magnetic disk 10B and concave portions 39b correspond to the convex portions 40a of the concave/convex pattern 40. When the magnetic disk 10B is manufactured using the stamper 30, since there are no convex portions 40a whose projecting end surfaces are excessively wide (convex portions 40a that are long in all the directions) in the address pattern regions Aab and the like likewise the manufacture of the magnetic disk 10A described above, a residual can be prevented from being formed in the address pattern regions Aab. It should be noted that since a method of manufacturing the magnetic disk 10B is the same as the method of manufacturing the magnetic disk 10A described above, the detailed description thereof is omitted.

In the hard disk drive 1 on which the magnetic disk 10B is mounted, when data is recorded to and reproduced from the magnetic disk 10B, the data corresponding to the concave/convex patterns 40 formed to the non-servo signal regions Ax and to the non-servo signal regions Axb and is discriminated as data different from servo data for tracking servo data by a control section 6 likewise the hard disk drive 1 on which the magnetic disk 10A described above is mounted. Specifically, the control section 6 places a magnetic head 3 on a desired track by driving an actuator 3b by controlling a driver 5 based on data, which corresponds to the concave/convex pattern 40 formed to the preamble pattern regions Ap, the address pattern regions Aab, and the burst pattern regions Aba (except the non-servo signal regions Axb), of the data including the servo data output from a detection section 4.

Further, in the hard disk drive 1, when the address data is extracted based on the data output from the detection section 4 in correspondence to the concave/convex pattern 40 formed to the address pattern regions Aab, the control section 6 decodes the output data from the detection section 4 assuming that it is encoded by RZ code and the like. As a result, a tracking servo control is executed based on the address data read out from the address pattern regions Aab, the burst signal read out from the burst pattern regions Aba, and the like, thereby the magnetic head 3 can be placed on a desired data recorded track (convex portions 40a). With this operation, data can be recorded and reproduced through the magnetic head 3 placed on the convex portions 40a (data recording tracks) in the data recording regions At.

As described above, according to the magnetic disk 10B and the hard disk drive 1, the concave portions 40b are formed in the address pattern regions Aab such that the respective lengths L1 along the rotating direction of the projecting end surfaces of the respective convex portions 40a have the lengths (second lengths) that are equal to each other in the respective same radius regions. As a result, there are no convex portions 40a whose lengths along the rotating direction of the projecting end surfaces are excessively long (convex portions 40a which are long in all the directions) in the address pattern regions Aab in which the lengths along the radius direction of the projecting end surfaces of the convex portions 40a tend to increase. Accordingly, when the layer of a non-magnetic material 15 formed so as to cover the concave/convex pattern 40 in the servo pattern regions Asb is etched, a thick residual can be prevented from being formed on the convex portions 40a in the address pattern regions Aab, unlike in the conventional magnetic disk 10z. With this arrangement, there can be provided the magnetic disk 10B, which has excellent flatness in the address pattern regions Aab and moreover can securely read the address data, and the hard disk drive 1 including the magnetic disk 10B. Further, the maximum lengths along the rotating direction of the convex portions 40a in the address pattern regions Aab are composed of only the type of the lengths L1 which are equal to each other in the respective same radii. Accordingly, even if the projecting end surfaces of any of the convex portions 40a in the address pattern regions Aab are sufficiently etched until the projecting end surfaces are exposed from the non-magnetic material 15, the other convex portions 40a can be prevented from being excessively etched. With this arrangement, there can be provided the magnetic disk 10B that can accurately read the address data and the hard disk drive 1 including the magnetic disk 10B.

According to the magnetic disk 10B and the hard disk drive 1, the concave portions 40b are formed in the servo pattern regions Asb such that at least a part of the concave portions 40b is included in the circular regions Qb whose diameters are equal to the maximum lengths L1a of the respective lengths L1 (the second lengths) when the circular regions Qb are disposed in any portion of the servo pattern regions Asb. Accordingly, there are no convex portions 40a whose projecting end surfaces are excessively long (the projecting end surfaces are excessively wide) in the entire areas of not only the address pattern regions Aab but also the servo pattern regions Asb. As a result, when the layer of the non-magnetic material 15 formed so as to cover the concave/convex pattern 40 in the servo pattern regions Asb is etched, a thick residual can be prevented from being formed on the convex portions 40a in the entire area of the servo pattern regions Asb including the non-servo signal regions Ax, Axb, unlike in the conventional magnetic disk 10z. With this arrangement, there can be provided the magnetic disk 10B, which has excellent flatness in the servo pattern regions Asb and moreover can securely read data for controlling tracking servo and the hard disk drive 1 including the magnetic disk 10B.

According to the magnetic disk 10B and the hard disk drive 1, the respective data recording tracks (convex portions 40a) are formed such that the lengths L3 along the radius direction of the substrate are equal to or less than the maximum lengths L1a of the respective lengths L1 (second lengths). Accordingly, there are no convex portions 40a whose projecting end surfaces are excessively long along the radius direction (convex portions 40a which are long in all the directions) in data recording regions At in which the lengths along the rotating direction of the projecting end surfaces of the convex portions 40a are long. As a result, when the layer of the non-magnetic material 15 formed so as to cover the concave/convex pattern 40 in the data recording regions At is etched, a thick residual can be prevented from being formed on the convex portions 40a (data recording tracks). Accordingly, there can be provided the magnetic disk 10B, which has excellent flatness in both the servo pattern regions Asb and the data recording regions At and moreover can stably record and reproduce data, and the hard disk drive 1 including the magnetic disk 10B.

According to the hard disk drive 1, since it is provided with the magnetic disk 10B and the control section 6 for executing tracking servo control processing based on a predetermined signal read from the servo pattern regions Asb of the magnetic disk 10B, data can be recorded and reproduced through the magnetic head 3 placed on the convex portions 40a (data recording tracks) in the data recording regions At without being affected by the existence of the concave/convex pattern 40 (dummy pattern) formed in the non-servo signal regions Ax.

Further, according to the stamper 30 for manufacturing the magnetic disk 10B, the concave/convex pattern 39 is formed which has the convex portions 39a formed in correspondence to the concave portions 40b of the concave/convex pattern 40 of the magnetic disk 10B and the concave portions 39b formed in correspondence to the convex portions 40a of the concave/convex pattern 40 of the magnetic disk 10B. Therefore, when the intermediate body 20 is subjected to the imprint processing, there can be formed the concave/convex pattern 41 in which no convex portions whose projecting end surfaces are excessively wide exist in the address pattern regions Aab and the like. Therefore, when etching processing is executed to the intermediate body 20 using a mask whose concave/convex positional relation is in coincidence with the concave/convex pattern 41 (in the example, the concave/convex pattern 42), convex portions 40a having wide projecting end surfaces can be prevented from being formed in the address pattern regions Aab and the like. Accordingly, when the layer of the non-magnetic material 15 formed so as to cover the concave/convex pattern 40 is etched, a thick residual can be prevented from being formed on the convex portions 40a in the address pattern regions Aab and the like. With this arrangement, the magnetic disk 10B, which has excellent flatness and moreover can securely read the address data and the like, can be manufactured. Further, since no excessively wide concave portions 39b exist in the stamper 30 in correspondence to the projecting end surfaces of the respective convex portions 40a of the magnetic disk 10B, when the concave/convex pattern 39 is pressed against a resin layer 18 of the intermediate body 20, the height of convex portions 41a can be prevented from becoming insufficient (insufficient thickness of the resin mask) due to the insufficient amount of movement of a resin material (resin layer 18) into the concave portions 39b. Accordingly, when a mask layer 17 is etched using the concave/convex pattern 41 as a mask, the convex portions 41a can be prevented from disappearing prior to the completion of etching of the mask layer 17. As a result, the concave/convex pattern 42 having the sufficiently deep concave portions 42b can be formed on a magnetic layer 14. With this arrangement, when the magnetic layer 14 is etched using the concave/convex pattern 42 as a mask, the concave/convex pattern 40 having the sufficiently deep concave portions 40b can be formed on the intermediate layer 13.

Figure 26:
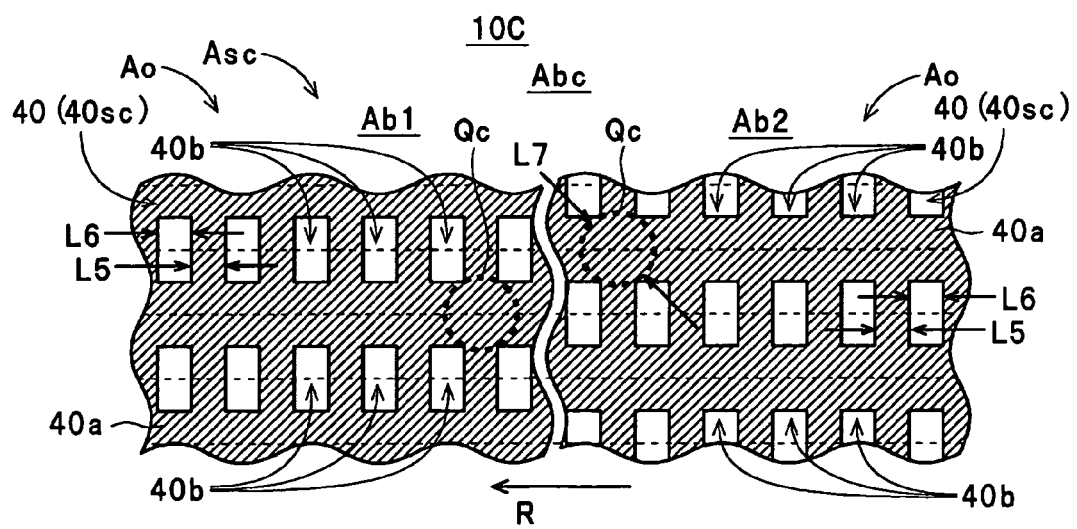
FIG. 26 is a plan view of yet still another magnetic disk showing an example of a burst pattern formed in a burst pattern region.

It should be noted that the present invention is by no means limited to the above arrangement. For example, in the magnetic disks 10A and 10B, the burst patterns are formed by arranging the plurality of convex portions 40a along the rotating direction in the burst pattern regions Aba, the present invention is not limited thereto. That is, as shown in a magnetic disk 10C shown in FIG. 26, the burst pattern may be formed by arranging a plurality of concave portions 40b in burst pattern regions Abc along the rotating direction in place of the convex portions 40a of the magnetic disks 10A and 10B. It should be noted that FIG. 26 shows only a first burst regions Ab1 and a second burst regions Ab2 in the burst pattern regions Abc. In this case, in the magnetic disk 10C, a support pattern 40sc of an address pattern and the like is formed such that the diameters L7 of circular regions Qc that are in contact with the four concave portions 40b in the burst pattern regions Abc are equal to or less than the maximum lengths of the respective lengths along the rotating direction of the projecting end surfaces of the convex portions 40a formed in address pattern regions. With this arrangement, when the circular regions whose diameters are equal to the maximum lengths of the lengths along the rotating direction of the projecting end surfaces of the convex portions 40a formed in the address pattern regions are disposed in any portions of servo pattern regions Asc, at least a part of the concave portions 40b (including the boundary portions between the convex portions 40a and the concave portions 40b) is included in the circular regions. As a result, when a non-magnetic material 15 is etched, a thick residual can be prevented from being formed in the servo pattern regions Asc also in the magnetic disk 10C likewise the magnetic disks 10A and 10B described above.

Figure 27:
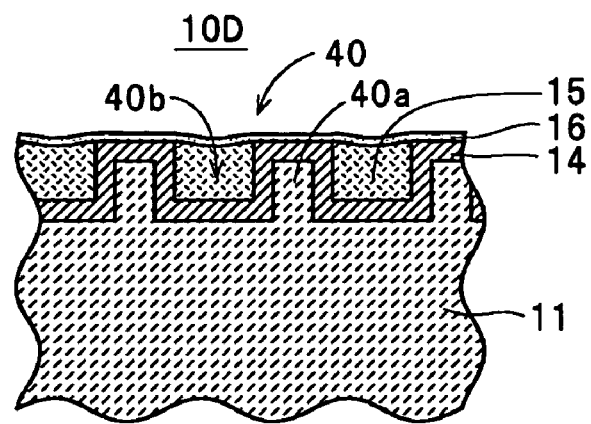
FIG. 27 is a cross-sectional view showing a layer structure of a further magnetic disk.
Figure 28:
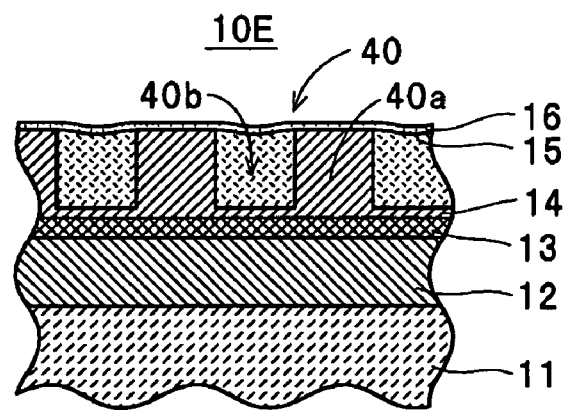
FIG. 28 is a cross-sectional view showing a layer structure of a still further magnetic disk.

Further, in the magnetic disks 10A, 10B, and the like, although the convex portions 40a of the concave/convex pattern 40 are entirely formed of the magnetic layer 14 (magnetic material) from the projecting ends to the base ends thereof, the convex portions constituting the concave/convex pattern of the present invention are not limited thereto. Specifically, as in, for example, a magnetic disk 10D shown in FIG. 27, when a thin magnetic layer 14 is formed so as to cover a concave/convex pattern formed on a glass substrate 11 (concave/convex pattern whose concave portions and convex portions have the same positional relation as the concave/convex pattern 40), the concave/convex pattern 40 can be composed of a plurality of convex portions 40a whose front surfaces are formed of a magnetic material and a plurality of concave portions 40b whose bottom surfaces are formed of the magnetic material. Further, as in a magnetic disk 10E shown in FIG. 28, a concave/convex pattern 40 may be formed by forming not only the bottom surfaces of convex portions 40a but also the bottom surfaces of concave portions 40b of a magnetic layer 14. In addition, a concave/convex pattern 40 may be composed of, for example, convex portions 40a formed in a concave/convex pattern 40, in which only the projecting ends of the convex portions 40a are formed of a magnetic layer 14 and the base ends thereof are formed of a non-magnetic material or a soft magnetic material (not shown).

In the magnetic disks 10A, 10B, and the like, although the dummy pattern (concave/convex pattern 40) is formed in the non-servo signal regions Ax and in the non-servo signal regions Axb, the present invention is not limited thereto. For example, non-servo signal regions whose entire areas are composed of concave portions may be set between the data recording regions At and the preamble pattern regions Ap, between the preamble pattern regions Ap and the address pattern regions Aaa (Aba), between the address pattern regions Aaa (Aab) and the burst pattern regions Aba, and between the burst pattern regions Aba and the data recording regions At as well as non-servo signal regions whose entire areas are composed of concave portions may be also set between the first burst regions Ab1 and the second burst regions Ab2 of the burst pattern regions Aba, between the second burst regions Ab2 and the third burst regions Ab3 thereof, and between the third burst regions Ab3 and the fourth burst regions Ab4 thereof. According to the magnetic disk formed as described above, the convex portions 40a in which a residual may be formed do not exist in the non-servo signal regions composed of concave portions. Therefore, when the layer of the non-magnetic material 15 formed so as to cover the concave/convex pattern 40 in the servo pattern regions is etched, a thick residual can be prevented from being formed in the entire area of the servo pattern regions. With this arrangement, a magnetic disk, which has excellent flatness in the servo pattern regions Asa (Asb) and moreover can securely read servo data, can be provided.

Further, in the magnetic disks 10A, 10B, and the like described above, although the pattern of the same type as the concave/convex pattern 40 in the preamble pattern regions Ap and the burst pattern regions Aba is formed in the non-servo signal regions Ax, Axb as the dummy pattern, the present invention is not limited thereto. For example, a concave/convex pattern 40 having an arbitrary shape, which is different from the concave/convex pattern 40 used for various types of servo signals, may be employed as the dummy pattern. The magnetic recording medium according to the present invention includes a magnetic recording medium, in which no non-servo signal region Ax exists and the preamble pattern regions, the address pattern regions, and the burst pattern regions are continuously formed in contact with each other in the rotating direction, and a magnetic recording medium in which no non-servo signal region Axb exists and the burst regions are continuously formed in contact with each other in the rotating direction. In the magnetic disks 10A, 10B, and the like, although the servo pattern 40sa (40sb) and the data track pattern 40t are formed only on the one surface side of the glass substrate 11, the present invention is not limited thereto. That is, the servo pattern 40sa (40sb) and the data track pattern 40t may be formed on both the front and back surfaces of the glass substrate 11. Further, the magnetic recording medium of the present invention is not limited to the perpendicular recording type magnetic recording medium as the magnetic disks 10A and 10B, and the present invention may be also applied to a longitudinal recording type magnetic recording medium.

What is claimed is:

1. A magnetic recording medium comprising:
a servo pattern region formed on at least one surface side of a substrate, the servo pattern region having a servo pattern formed of a concave/convex pattern having a plurality of convex portions and concave portions, at least projecting end portions of the convex portions are formed of a magnetic material; and a data recording region formed on the one surface side of the substrate, the data recording region having a data track pattern on which a concentric or spiral data recording track is formed, wherein the concave portions are formed in an address pattern region of the servo pattern region such that the maximum lengths, which are located in the respective same radius regions each having the same distance from the center of the data track pattern, of the respective lengths along the rotating direction of the substrate of projecting end surfaces of the respective convex portions constituting the concave/convex pattern for an address pattern are set to first lengths that are double the minimum lengths along the rotating direction of the projecting end surfaces of the respective convex portions in the respective same radius regions.

2. A magnetic recording medium according to claim 1, wherein the concave portions constituting the concave/convex pattern are formed in the servo pattern region such that when a circular region whose diameter is equal to the maximum length of the respective first lengths is disposed in any portions of the servo pattern region, at least a part of the concave portions is included in the circular region.

3. A magnetic recording medium according to claim 1, wherein:
a plurality of the data recording tracks are formed of convex portions, at least the projecting end portions of which are formed of the magnetic material; and
the respective data recording tracks are formed such that the lengths thereof along a radius direction of the substrate are equal to or less than the maximum length of the respective first lengths.

4. A recording/reproducing apparatus comprising:
the magnetic recording medium according to claim 1; and
a control section for executing tracking servo control processing based on a predetermined signal read from the servo pattern region of the magnetic recording medium.

5. A stamper for manufacturing a magnetic recording medium comprising a concave/convex pattern formed thereon, the concave/convex pattern having convex portions formed in correspondence to the concave portions of the concave/convex pattern of the magnetic recording medium according to claim 1 and concave portions formed in correspondence to the convex portions of the concave/convex pattern of the magnetic recording medium.

6. A magnetic recording medium comprising:
a servo pattern region formed on at least one surface side of a substrate, the servo pattern region having a servo pattern formed of a concave/convex pattern having a plurality of convex portions and concave portions, at least projecting end portions of the convex portions are formed of a magnetic material; and
a data recording region formed on the one surface side of the substrate, the data recording region having a data track pattern on which a concentric or spiral data recording track is formed, wherein the concave portions are formed in an address pattern region of the servo pattern region such that the respective lengths along the rotating direction of the substrate of projecting end surfaces of the respective convex portions constituting the concave/convex pattern for an address pattern are set to A lengths that are equal to each other in the respective same radius regions each having the same distance from the center of the data track pattern.

7. A magnetic recording medium according to claim 6, wherein the concave portions constituting the concave/convex pattern are formed in the servo pattern region such that when a circular region whose diameter is equal to the maximum length of the respective A lengths is disposed in any portions in the servo pattern region, at least a part of the concave portions is included in the circular region.

8. A magnetic recording medium according to claim 6, wherein:
a plurality of the data recording tracks are formed of convex portions at least the projecting end portions of which are formed of the magnetic material; and
the respective data recording tracks are formed such that the lengths thereof along a radius direction of the substrate are equal to or less than the maximum length of the respective A lengths.

9. A recording/reproducing apparatus comprising:
the magnetic recording medium according to claim 6; and
a control section for executing tracking servo control processing based on a predetermined signal read from the servo pattern region of the magnetic recording medium.

10. A stamper for manufacturing a magnetic recording medium comprising a concave/convex pattern formed thereon, the concave/convex pattern having convex portions formed in correspondence to the concave portions of the concave/convex pattern of the magnetic recording medium according to claim 6 and concave portions formed in correspondence to the convex portions of the concave/convex pattern of the magnetic recording medium.

* * * * *